(12) United States Patent
Hyde et al.

(10) Patent No.: US 8,305,214 B2
(45) Date of Patent: Nov. 6, 2012

(54) ELECTRONIC TAG CONFIGURED TO SENSE A PLANT ENVIRONMENT

(75) Inventors: Roderick A Hyde, Redmond, WA (US); Muriel Y Ishikawa, Livermore, CA (US); Jordin T Kare, Seattle, WA (US); Lowell L Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 979 days.

(21) Appl. No.: 12/290,011

(22) Filed: Oct. 23, 2008

(65) Prior Publication Data

US 2009/0231102 A1  Sep. 17, 2009

Related U.S. Application Data

(63) Continuation-in-part of application No. 12/077,066, filed on Mar. 14, 2008, and a continuation-in-part of application No. 12/215,674, filed on Jun. 27, 2008, and a continuation-in-part of application No. 12/283,299, filed on Sep. 9, 2008.

(51) Int. Cl.
*G08B 13/14* (2006.01)

(52) U.S. Cl. .......... 340/572.1; 340/10.1; 47/1.01 R

(58) Field of Classification Search ........... 340/572.1, 340/10.1; 47/1.01 R
See application file for complete search history.

(56) References Cited

U.S. PATENT DOCUMENTS

| | | | |
|---|---|---|---|
| 4,379,372 A * | 4/1983 | Alexander et al. ........... 40/645 |
| 4,570,368 A | 2/1986 | Stover |
| 4,972,616 A | 11/1990 | Doll |
| 5,339,517 A | 8/1994 | Diemer |
| 6,597,465 B1 | 7/2003 | Jarchow et al. |
| 6,671,698 B2 | 12/2003 | Pickett et al. |
| 6,701,665 B1 | 3/2004 | Ton et al. |
| 6,745,127 B2 | 6/2004 | Crosby |
| 6,888,458 B2 * | 5/2005 | Carlson ........... 340/540 |
| 6,963,881 B2 | 11/2005 | Pickett et al. |
| 7,076,900 B2 | 7/2006 | Faulkner |
| 7,080,577 B2 | 7/2006 | Latschbacher et al. |
| 7,143,066 B2 | 11/2006 | Shear et al. |
| 7,200,804 B1 | 4/2007 | Khavari et al. |
| 7,233,250 B2 | 6/2007 | Forster |
| 7,316,202 B2 | 1/2008 | Fantin et al. |
| 7,403,855 B2 | 7/2008 | Fuessley et al. |
| 7,702,462 B2 | 4/2010 | Fuessley et al. |
| 7,761,334 B2 | 7/2010 | Pickett et al. |

(Continued)

FOREIGN PATENT DOCUMENTS

JP  2006101739 A  4/2006

(Continued)

OTHER PUBLICATIONS

Data Identifier and Application Identifier Standard, American National Standard, Material Handling Industry (Oct. 9, 2006), pp. 1-110.

(Continued)

*Primary Examiner* — Eric M Blount
(74) *Attorney, Agent, or Firm* — Workman Nydegger

(57) ABSTRACT

A system for tracking at least one plant includes an electronic tag including an interrogation interface and memory circuitry and a package for the electronic tag, the package being configured for physical association with at least one corresponding plant.

70 Claims, 13 Drawing Sheets

U.S. PATENT DOCUMENTS

| | | |
|---|---|---|
| 7,798,746 B2 | 9/2010 | Byles |
| 2001/0029996 A1 | 10/2001 | Robinson |
| 2002/0170229 A1 | 11/2002 | Ton et al. |
| 2003/0066234 A1 | 4/2003 | Bussey, Jr. |
| 2004/0088330 A1 | 5/2004 | Pickett et al. |
| 2004/0088916 A1 | 5/2004 | Ton et al. |
| 2005/0134461 A1 | 6/2005 | Gelbman et al. |
| 2006/0022824 A1 | 2/2006 | Olsen, III et al. |
| 2006/0080819 A1 | 4/2006 | McAllister |
| 2006/0085266 A1 | 4/2006 | Wei et al. |
| 2006/0116791 A1 | 6/2006 | Ravula et al. |
| 2006/0220955 A1 | 10/2006 | Hamilton |
| 2007/0044445 A1 | 3/2007 | Spicer et al. |
| 2007/0079536 A1 | 4/2007 | Hall |
| 2007/0152045 A1 | 7/2007 | Erickson et al. |
| 2007/0185749 A1* | 8/2007 | Anderson et al. ................ 705/7 |
| 2007/0222596 A1 | 9/2007 | Kleijn et al. |
| 2007/0285229 A1 | 12/2007 | Batra et al. |
| 2008/0074254 A1 | 3/2008 | Townsend et al. |
| 2008/0129497 A1 | 6/2008 | Woodard et al. |
| 2008/0220721 A1 | 9/2008 | Downie et al. |
| 2008/0297350 A1* | 12/2008 | Iwasa et al. ................ 340/572.1 |
| 2009/0042180 A1 | 2/2009 | Lafferty et al. |
| 2009/0070037 A1 | 3/2009 | Templeton et al. |
| 2009/0108997 A1 | 4/2009 | Petterson et al. |
| 2009/0128336 A1* | 5/2009 | Huang et al. ................ 340/572.1 |
| 2009/0319400 A1 | 12/2009 | Pratt |
| 2010/0283584 A1 | 11/2010 | McAllister |

FOREIGN PATENT DOCUMENTS

| | | |
|---|---|---|
| WO | WO 2004/023377 A1 | 3/2004 |
| WO | WO 2007/042327 A1 | 4/2007 |

OTHER PUBLICATIONS

Hyde et al.; U.S. Appl. No. 12/077,066, filed Mar. 14, 2008.

Hyde et al.; U.S. Appl. No. 12/215,674, filed Jun. 27, 2008.

Hyde et al; U.S. Appl. No. 12/283,299, filed Sep. 9, 2008.

* cited by examiner

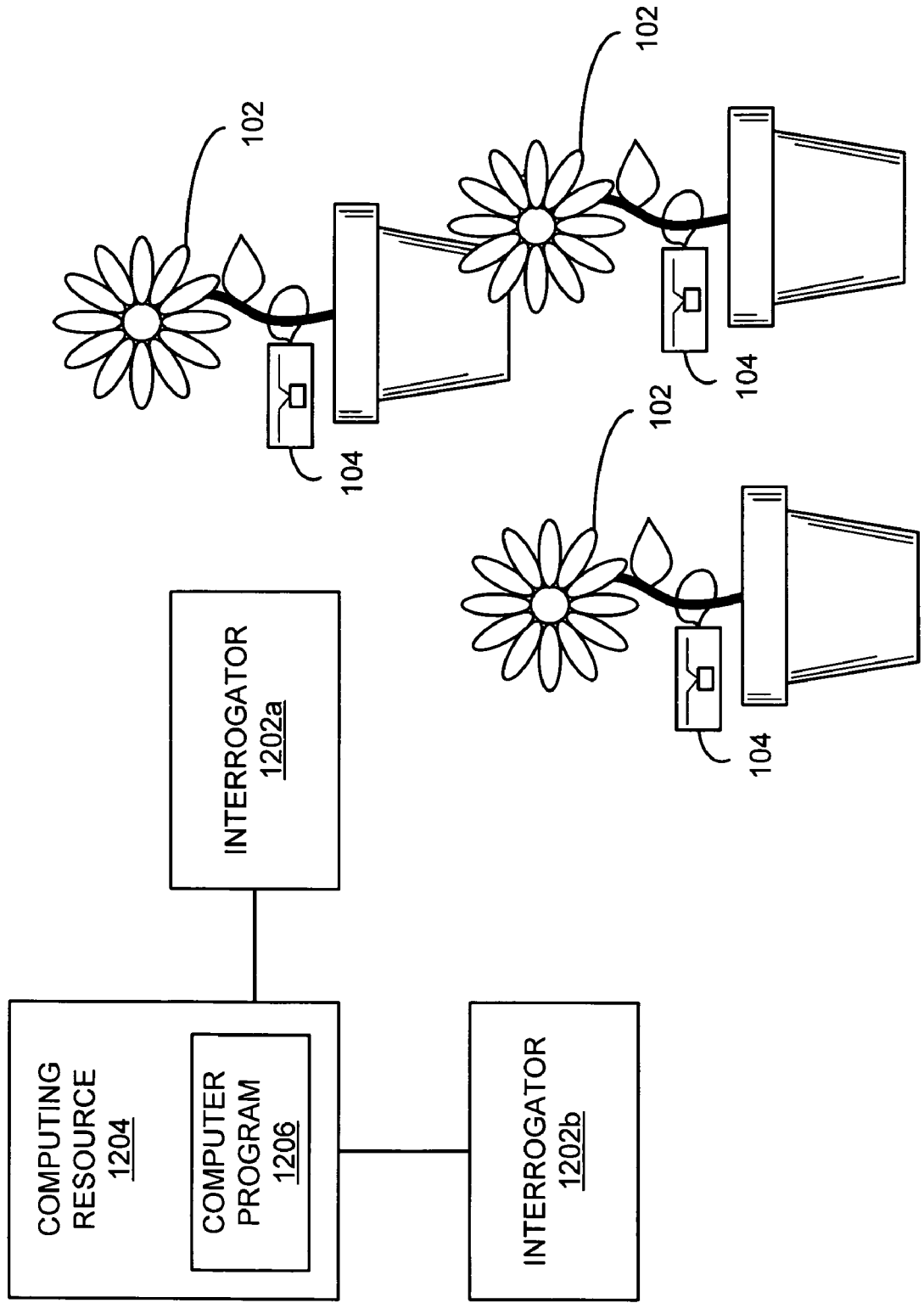

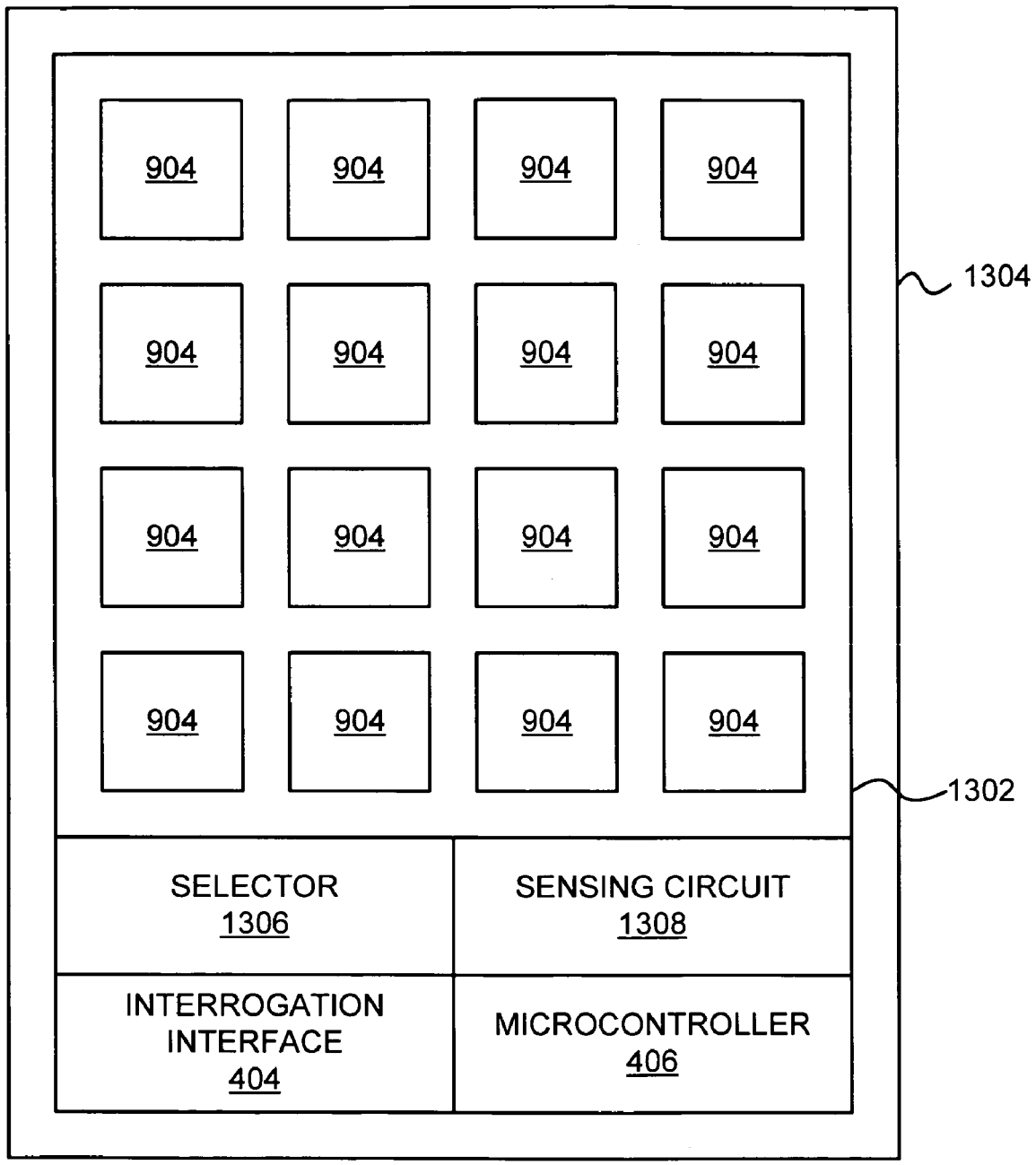

ELECTRONIC TAG CONFIGURED TO SENSE A PLANT ENVIRONMENT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/077,066, entitled METHOD AND APPARATUS FOR TRACKING PLANTS WITH AN ELECTRONIC TAG, naming Roderick A. Hyde, Muriel Y. Ishikawa, Jordin T. Kare, and Lowell L. Wood, Jr. as inventors, filed Mar. 14, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/215,674, entitled METHOD AND SYSTEM FOR CORRELATING EXTERNAL DATA TO A PLANT WITH AN ELECTRONIC TAG, naming Roderick A. Hyde, Muriel Y. Ishikawa, Jordin T. Kare, and Lowell L. Wood, Jr. as inventors, filed Jun. 27, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/283,299, entitled ELECTRONIC TAG AND METHOD FOR USING AN ELECTRONIC TAG CONFIGURED TO TRACK AT LEAST ONE PLANT, naming Roderick A. Hyde, Muriel Y. Ishikawa, Jordin T. Kare, and Lowell L. Wood, Jr. as inventors, filed Sep. 9, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, an electronic tag includes an interrogation interface and a sensing circuit configured to sense the environment of at least one plant. The sensing circuit may include at least one portion that may be activated responsive to a command received through the interrogation interface. The sensing circuit may include plural portions configured to sense data that may be combined to determine composite data.

According to an embodiment, a system includes an interrogator configured to interrogate a plurality of electronic tags equipped with at least one sensor configured to sense the environment of at least one plant. The interrogator may be operable to transmit interrogation commands and/or queries related to activating and/or receiving data from the at least one sensor.

According to an embodiment, at least one environmental parameter of at least one plant may be measured by an electronic tag including a sensor. A response may be driven depending on one or more parameter values. For example a treatment schedule for the at least one plant may be generated, such as to compensate for variations in the at least one environmental parameter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 12 is a simplified diagram of a system for sensing growth conditions of plants, according to an embodiment.

FIG. 13 is a block diagram of a radio frequency tag configured to measure the environment of at least one plant, according to an embodiment.

DETAILED DESCRIPTION

Figure 1:
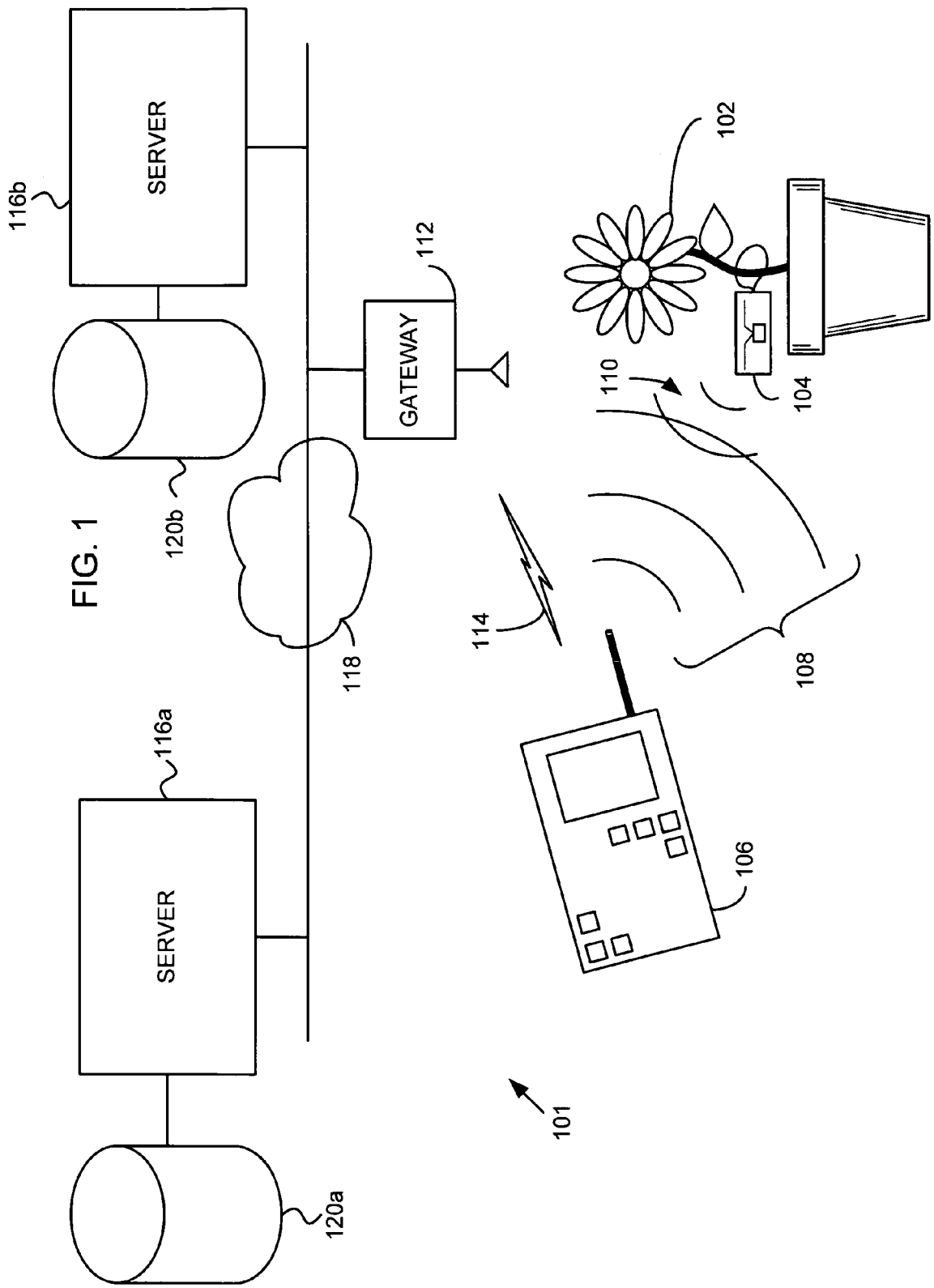
FIG. 1 is an illustrative diagram of a system configured to interface to one or more populations of electronic tags and for performing methods described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is an illustrative diagram of a system 101 for interfacing to one or more electronic tags 104 coupled to one or more plants 102 according to an embodiment. An electronic tag interrogator 106 may interrogate the electronic tag 104 to receive identification data corresponding to the at least one plant 102. For example, the electronic tag interrogator 106 may include a radio frequency identification (RFID) interrogator that is configured to emit an interrogation field 108 including a radio frequency signal to illuminate one or more radio frequency tags (RF tags) 104. The interrogation field or interrogation signal 108 may be modulated with an appropriate pattern for evoking a response 110 from the RF tag 104. According to some embodiments, the electronic tag interrogator may be in the form of a hand-held and/or portable apparatus that may optionally be in communication with a remote device 112 via a communication signal 114. For example, the remote device 112 may include a gateway, host computer, etc. configured to communicate with the electronic tag interrogator 106 via a radio communication signal 114.

According to an embodiment, the remote device 112 may be operatively coupled to a second remote device 116a, such as a server, over a network 118. The second remote device 116a may include a storage apparatus 120a configured to store at least a portion of a database including information corresponding to the identification data from the electronic tag 104 and the associated at least one plant 102. The remote device 112 may be operatively coupled to a third remote device 116b such as a server, over the network 118. The third remote device 116b may also include a storage apparatus 120b configured to store at least a portion of a database including information corresponding to the identification data from the electronic tag 104 and the associated at least one plant 102.

Embodiments of electronic tags may include user-writable memory. The memory contents may be determined by the user. The user may structure data in the memory according to open or closed standards. According to some embodiments, the memory of the electronic tag may include data structured for access by a plurality of trading partners. As will be described additionally below, electronic tags may be configured to remain with at least one plant 102 while the at least one plant 102 proceeds to market.

The electronic tag 104 may, for example, include various types of electronic tags including a radio frequency tag, such as a passive radio frequency tag, an active radio frequency tag, a backscatter radio frequency tag, a half-duplex radio frequency tag, or a full-duplex radio frequency tag, for example; a touch memory device; a proximity card; a smart card; a photonic tag; etc. Accordingly, the interrogation signal 108 and response signal 110 may include corresponding forms such as radio frequency interrogation and response, touch memory interrogation and response, proximity card interrogation and response, smart card interrogation and response, etc.

Additionally, electronic tags may include read-only, read/write, and write-once-read-many-times (WORM) capabilities. In the case of a writable tag technology such as a read/write or WORM, the relationship shown diagrammatically in FIG. 1 may include writing data from the interrogator 106 to the electronic tag 104 via the interrogation signal 108 and response 110. According to an embodiment, the interrogator 106 may write to the electronic tag 104 identification data and/or one or more external data coordinates and/or other data associated with accessing external data related to the at least one plant 102.

While the at least one plant 102 is illustrated as a single plant in a pot, other forms are contemplated such as flats, rows, pallets, bare root, root ball, groupings, arrangements, beddings, portable gardens, etc.

The at least one plant may include at least one seed, cutting, rhizome, bulb, corm, tuber, annual, biennial, cut flower, perennial, grass, creeper, climber, vine, fern, shrub, bush, or tree.

Figure 2:
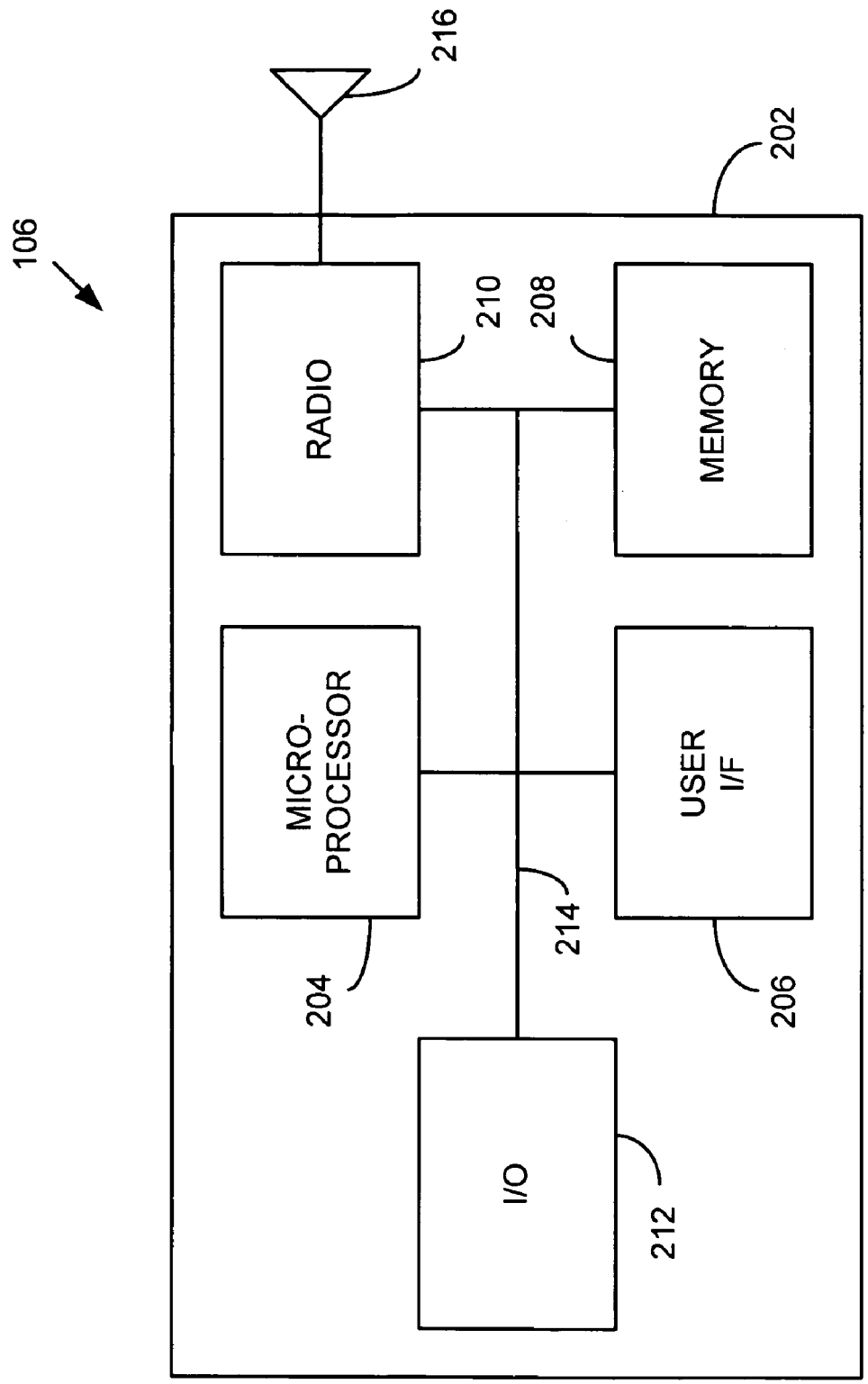
FIG. 2 is a block diagram of an illustrative electronic tag interrogator as depicted in FIG. 1, according to an embodiment.

FIG. 2 is a block diagram of an illustrative electronic tag interrogator 106 as depicted in FIG. 1, according to an embodiment. The electronic tag interrogator 106 may be embodied, for example, as an RF tag interrogator. The interrogator 106 may include a housing 202 substantially enclosing a microprocessor 204, user interface 206, memory circuitry 208, a radio configured to interrogate one or more types of RF tags, and an interface 212 operatively connected by one or more data buses 214. The radio 210 may include one or more antennas 216 operable to illuminate one or more RF tags with an interrogation field and receive a response signal from the one or more RF tags. The interface 212 may itself include a radio configured for communication with a host computer or computer network.

The interrogator 106 may be operable to run a computer program such as a data parsing program configured to parse data pertaining to one or more plants from one or more RF tags, and determine one or more external data coordinates corresponding to a database holding information corresponding to the data. Additionally or alternatively, the interrogator 106 may be operable to transmit received data over the interface 212 to a remote processing resource 112, 116a, 116b and receive information corresponding to the at least one plant (not shown) from the remote processing resource.

According to an illustrative embodiment, the RF tag interrogator 106 may receive a command such as a trigger pull through the user interface 206, interrogate an RF tag associated with at least one plant (not shown) with the radio 210 and at least one antenna 216 to receive data corresponding to the at least one plant, temporarily write received data to workspace in the memory circuitry 208, and execute a program from memory circuitry 208 with the microprocessor 204 to determine a location of an external resource for performing a query of or writing data to an external database.

Referring back to FIG. 1, one or more external resources or servers 120a, 120b may provide logical linkages between electronic tags 104, databases for storing data corresponding to the at least one population of at least one plants, tag population query nodes or other functions. The two or more external resources 120a, 120b may each include a portion of information related to the at least one plant. Alternatively, the two or more external resources 120a, 120b may represent a plurality of potential resources for storing or retrieving data related to the at least one plant, supporting networked query functions, and provide other resources related to reading, writing, and tracking.

Each external resource 120a, 120b that includes data disposed therein related to at least one plant includes the data also disposed on the database for identifying a portion of the database corresponding to the at least one plant.

The electronic tag interrogator 106 may include a computer program configured to store additional data corresponding to a record of additional treatments provided to the at least one plant upon such treatment application. The electronic tag interrogator 106 may include a computer program configured to retrieve from the database at least a portion of the data corresponding to the care of the at least one plant and determine whether a treatment is scheduled to be provided to the at least one plant. The electronic tag interrogator 106 may provide an indication to administer the treatment to the at least one plant if the treatment is scheduled. Upon receiving acknowledgement of the treatment being provided, the electronic tag interrogator 106 may then store in the database data corresponding to a record of providing the treatment.

The electronic tag interrogator 106 may further store location data in an industry accessible registry, the location data corresponding to an address for accessing the database. For example, server 120a may be a resource that provides the database for storing treatment information for plants, and server 120b may be a resource that provides a database for storing one or more locations of server(s) 120a, where multiple instances of servers 120a are accessible for query and/or writing.

Referring to FIG. 1, a software program running on server 120a may associate in a database 116a data corresponding to the care of at least one plant 102 with data identifying the at least one plant 102. The data identifying the at least one plant 102 may be retained in an electronic identification tag 104 associated with each at least one plant 102. The data corresponding to the care of the at least one plant 102 may include plant care instructions or a record of at least one plant care treatment provided to the at least one plant 102.

For embodiments where the electronic tag 104 is writable, the electronic tag interrogator 106 may write to the electronic identification tag 104 a location corresponding to the database 116a where related data is disposed. Additionally or alternatively, the external resource 120a, the electronic tag interrogator 106, or another computing resource may transmit to a second resource 120b at least a portion of the data identifying the at least one plant and data corresponding to the location of the first database 116b for storage on the second database 116b. The data corresponding to the location of the first database 116a may be an accessible address such as an IP address or a URL from which the data corresponding to the care of the at least one plant may be retrieved.

Other embodiments may include additional or reduced functionality in the interrogator 106, may rely on increased or reduced functionality in an external resource, may be operated by a user or operate automatically, may be interfaced to a treatment device to detect treatments, and/or may rely on alternative interrogation technologies. The interface 212 may include a wired interface and/or an intermittent interface such as a memory stick, USB drive, or other detachable memory.

Figure 3:
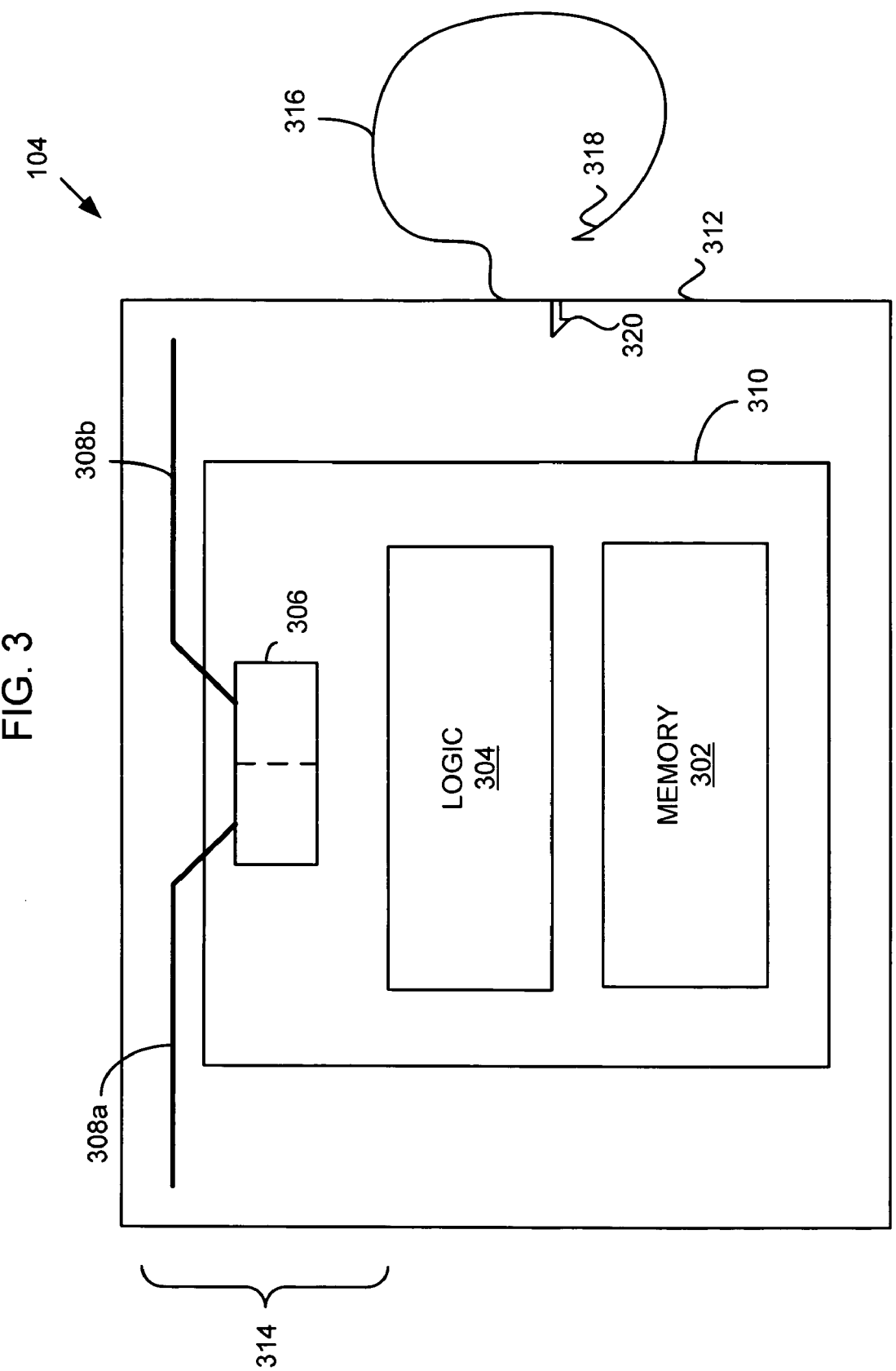
FIG. 3 is a block diagram of an illustrative electronic tag as depicted in FIG. 1, according to an embodiment.

FIG. 3 is a block diagram of an illustrative electronic tag 104 as depicted in FIG. 1, according to an embodiment wherein the electronic tag is in the form of a radio frequency (RF) tag. The RF tag 104 includes a memory circuit 302 (which may be read/write, WORM, or read-only, for example) and a logic circuit 304 operatively coupled to the memory circuit 302. A radio frequency transceiver 306 is operatively coupled to the logic circuit 304. The radio frequency transceiver 306 may be further coupled to an antenna 308a, 308b which may include two respective antenna segments 308a and 308b. The radio frequency transceiver 306 may be configured to provide a switched connection between the antenna segments 308a and 308b. According to an embodiment, the memory circuit 302, logic circuit 304, and transceiver 306 may be formed on a die 310 as an integrated circuit. The integrated circuit 310 and the antenna 308a, 308b may be disposed in a package 312 that may include a printed circuit, for example.

The antenna 308a, 308b, transceiver 306, and optionally at least a portion of the logic circuit 304 may provide an interrogation interface 314 configured to communicate with an external interrogator (not shown). According to an embodiment, the transceiver 306 may hold the antenna portions 308a and 308b in substantial continuity during a first portion of a communication session. During the first portion of the communication session, an interrogation signal (not shown) in the form of radio frequency illumination may be received by the antenna 308a, 308b. In the case of a passive electronic tag 104, the radio frequency illumination may provide an AC voltage that is rectified by a portion of the transceiver 306 and used to charge one or more capacitors (not shown) that in turn provide DC power rails to operate the transceiver 306, logic 304, and memory 302. When the interrogation signal is received, the capacitor(s) charge and the transceiver 306, logic 304, and optionally the memory 302 may be powered up. According to some embodiments, it may be advantageous to power up only portions of the electronic tag 104 as the portions are needed.

Various messages may be encoded on the interrogation field. For example, one message may request tag ID, such as a segment of data by which the unique identity of the electronic tag 104 may be identified. Another message may specify a tag ID and request a portion or more of data held in the memory 302 of the particular electronic tag associated with the tag ID. According to one embodiment, the electronic tag 104 may respond to a data request in half-duplex as a backscatter signal.

For example, the electronic tag 104 may receive a request for at least a portion of data from the memory 302 over a modulated interrogation field (not shown) during a first portion of the communication session. The interrogator (not shown) may then cease to modulate the interrogation signal but maintain illumination of the signal onto the antenna 308a, 308b. The logic circuit 304 (powered by the illumination provided by the interrogation signal) then fetches the requested portion of data from the memory 302 and outputs the data to the transceiver 306. The transceiver 306 selectively couples and uncouples the portions of the antenna 308a, 308b in a pattern corresponding to the data received from the logic 304. The selective coupling and uncoupling of the antenna portions 308a, 308b creates a corresponding variation in reflectivity to the radio frequency illumination provided by the antenna. The variation in reflection may then be detected by the interrogator (not shown) and converted into data corresponding to the data fetched from memory 302.

Of course, substantial handshaking, error correction, and other interactions between the interrogation signal (not shown) and the response signal (not shown) may be used to improve communication reliability, extend range, and/or provide other capabilities.

Similarly, data may be written from an interrogator (not shown) to the memory 302 of an electronic tag 104 using a similar approach. Data that may be written to and/or read from the memory 302 an electronic tag 104 may include a range of contents. For example, the data may include an identifier corresponding to the at least one plant and/or one or more data coordinates referencing external data locations corresponding to the at least one plant.

According to an embodiment, the package 312 may include encapsulation or other form of protection for the circuitry and/or antenna. The package 312 may include a coupling 316 configured to couple to at least one plant to attachment to a plant (not shown). In the example of FIGS. 1 and 3, the coupling 316 may include a loop such as a "zip tie" or lanyard that provides a permanent or semi-permanent association with a plant or a group of plants. According to an embodiment, the coupling 316 may be formed integrally with the package 312 for convenient attachment to one or more plants.

The coupling 316 may be embodied as a lanyard 316 having a coupling tip 318. The coupling tip 318 may be configured to insert into and be retained by a corresponding coupling socket 320 formed in the electronic tag package 312 to effectively form an attachment to the at least one plant 102.

Figure 4:
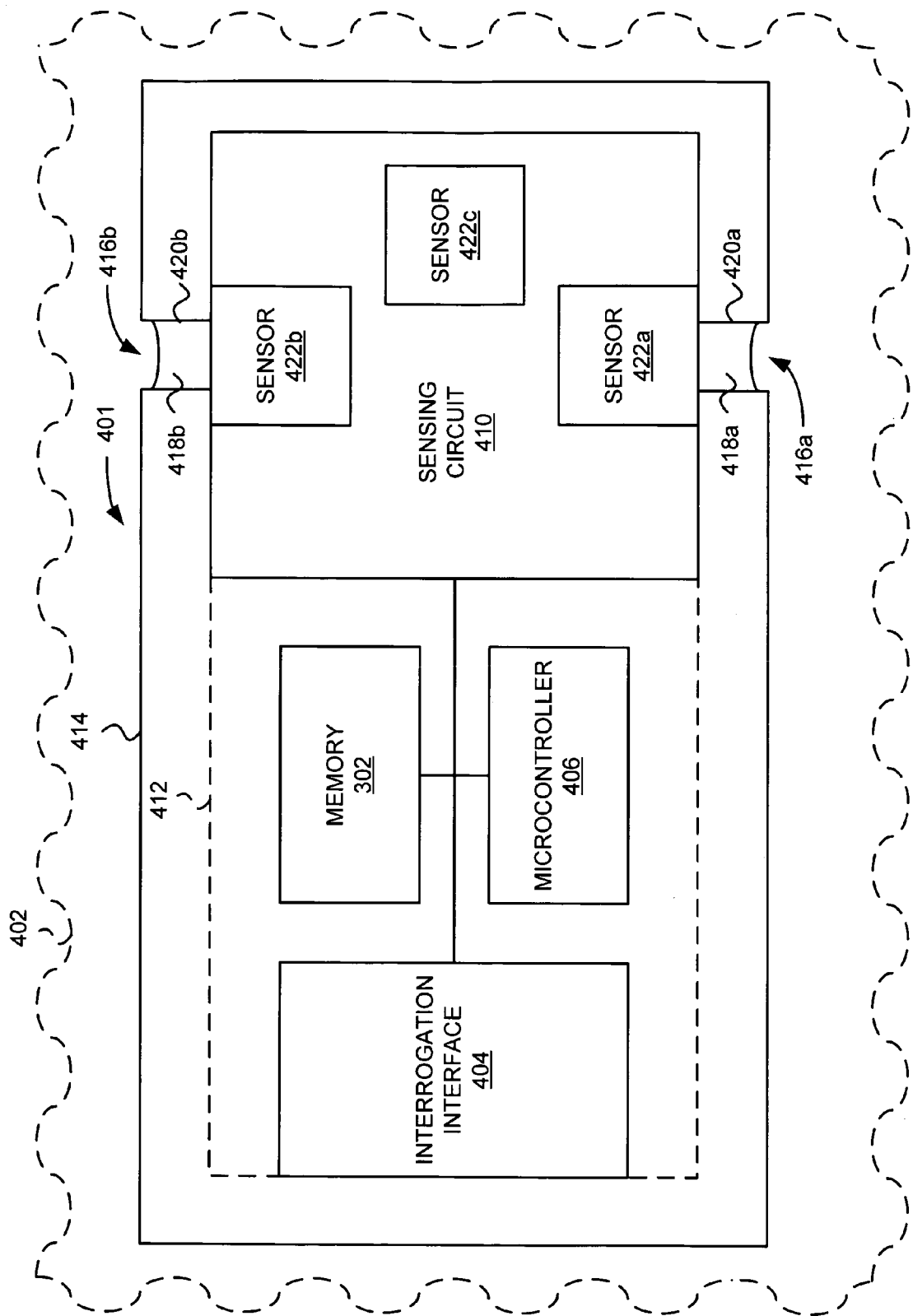
FIG. 4 is a block diagram of an electronic tag including a sensing circuit operatively coupled to an environment of at least one plant, according to an embodiment.

FIG. 4 is a block diagram of an electronic tag 401 for measuring the environment of at least one plant 402, according to an embodiment. The electronic tag 401 includes an interrogation interface 404, a microcontroller 406, memory circuitry 302, and a sensing circuit 410 operatively coupled to the microcontroller and configured to sense a parameter corresponding to the environment of at least one plant.

According to an embodiment, the electronic tag 401 may be passive. Alternatively, the electronic tag 401 may be battery powered. The electronic tag may be disposed on an integrated circuit 412.

The electronic tag 401 may include a package 414 for the electronic tag, the package including at least one fluid receiving volume 416a in operative communication with the sensing circuit 410. The at least one fluid receiving volume 416a may be covered, for example prior to deployment of the electronic tag 401, such as by a removable cover (not shown) operatively coupled to the package 414. For example, a welded foil cover, snap-off cover, screw-off cover, pressure-sensitive adhesive cover (e.g. with a removable adhesive), or other manually- or machine-removable wall or plug may provide separation of the at least one fluid receiving volume 416a from the environment 402 prior to commencing sensing of the environment. The illustrative embodiment 401 may include plural fluid receiving volumes 416a-416b. The at least one fluid receiving volume 416a may be further configured for operative communication with an environment 402 at or in the vicinity of the at least one plant. The at least one fluid receiving volume may be substantially nonenclosed. Fluid 418a, 418b access to the at least one fluid receiving volume 416a, 416b may be dependent upon surface tension forces. The fluid 418a, 418b attraction and/or occupation of the at least one fluid receiving volume 416a, 416b may be dependent upon interaction of the fluid 418a, 418b with at least one surface 420a, 420b of the fluid receiving volume 416a, 416b. For example, walls 420a, 420b or pores of the fluid receiving volume 416a, 416b may be characterized by relatively high surface energy configured to attract the fluid 418a, 418b from the environment 402.

Alternatively, the fluid 418a, 418b may be provided prior to deployment of the electronic tag 401 into the environment 402. The fluid 418a, 418b may be selected to adsorb or dissolve a moiety from the environment 402 and present the moiety to the sensing circuit 410. For example, at least one fluid receiving volume 416a, 416b may be provided with a fluid such as a hydrocarbon or substituted hydrocarbon selected to attract and dissolve a solute from the environment 402.

The at least one fluid receiving volume 416a-416b may be operatively coupled to corresponding sensing circuit portions 422a-422b. For example, the sensing circuit portions may include sensors configured to measure an environmental parameter. The sensing circuit portions 422a-422b may be configured to sense substantially the same environmental parameter or may be configured to sense different environmental parameters.

Figure 5:
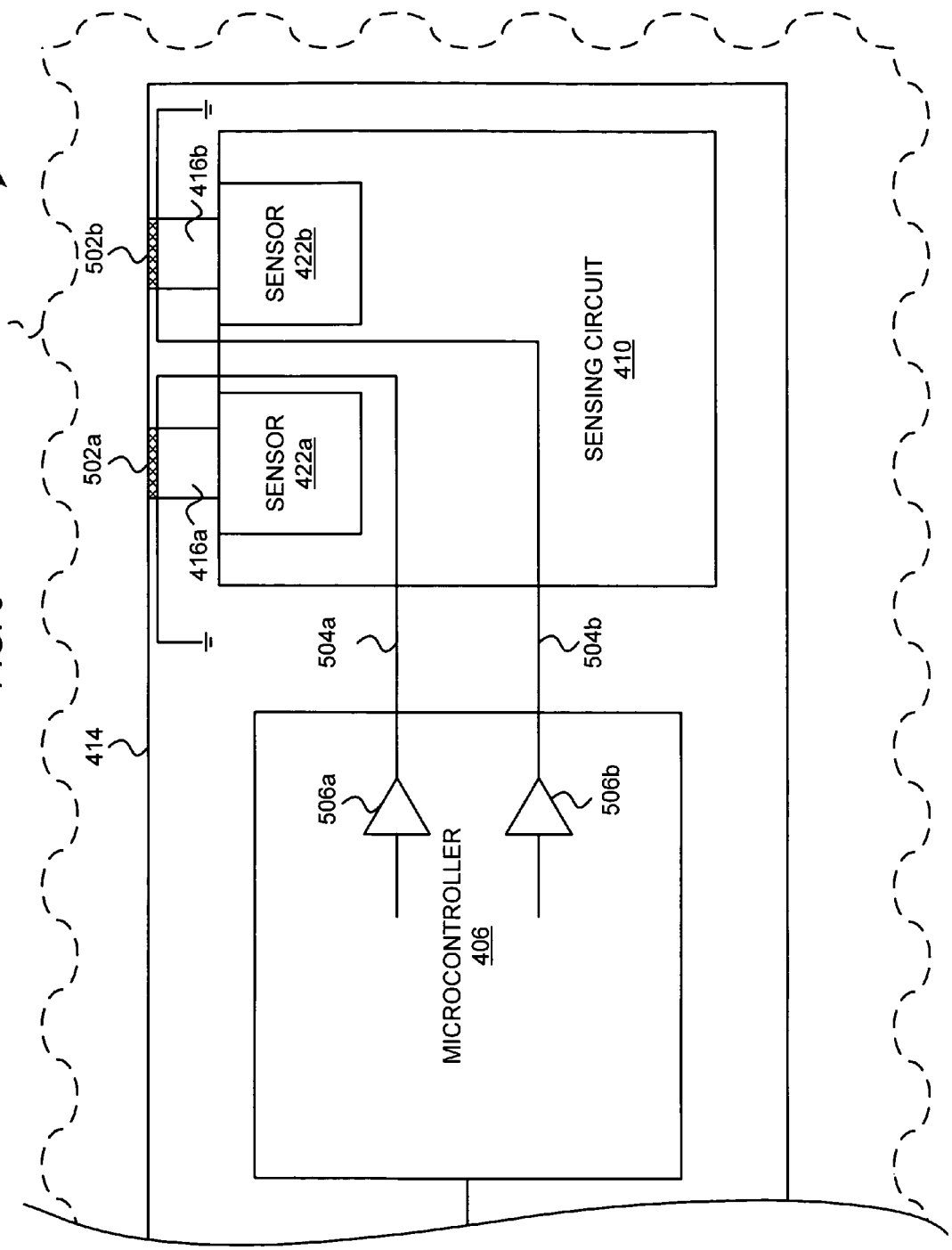
FIG. 5 is a diagram of a portion of an electronic tag including a valve operable to selectively open a fluid receiving volume to an environment, according to an embodiment.

FIG. 5 is a diagram of a portion of an electronic tag 501 including at least one valve 502a, 502b operable to selectively open a fluid receiving volume 416a, 416b to an environment 402, according to an embodiment. One or more fluid receiving volumes 416a, 416b may include a corresponding valve 502a, 502b operatively coupled to the microcontroller 406 and the fluid receiving volume 416a, 416b. The valve 502a, 502b may be configured to open responsive to a valve actuation signal on a valve actuation signal transmission path 504a, 504b from the microcontroller 406. For example, the microcontroller 406 may include one or more amplifier circuits 506a, 506b, such as a charge pump or conventional amplifier circuit. The amplified signal may act to cause heating and fusing in the respective valve 502a, 502b to open the valve and expose the corresponding fluid receiving volume 416a, 416b to the environment 402. A valve 502a may optionally be operatively coupled to a plurality of fluid receiving volumes 416a, 416b.

According to an embodiments the microcontroller 406 may provide one or more valve actuation signals on valve actuation signal transmission paths 504a, 504b that open a sequence of the plural receiving volumes 416a, 416b. The receiving volumes 406a-406b may thus sequentially sense an environment at or in the vicinity of the at least one plant responsive to one or more valve actuation signals from the microcontroller.

For example, the plurality of receiving volumes 416a, 416b may be coupled to a corresponding plurality of sensing circuit portions 422a, 422b including a plurality having substantially the same sensor sensitivity. The sensor sensitivity may degrade or lose sensitivity upon sensing an aspect of the environment 402. For example, an analyte sensor may fill with analyte and lose sensitivity to subsequent exposures. By sequentially opening a series of valves 502a, 502b to a corresponding series of fluid receiving volumes 416a, 416b and exposing fresh, unfilled analyte sensors to the environment 402, the electronic tag 501 may retain sensitivity to the analyte for a period of time exceeding the capability of any one sensing circuit portion 422a, 422b.

Alternatively, the plurality of receiving volumes 416a, 416b may be coupled to a corresponding plurality of sensing circuit portions 422a, 422b including a plurality of sensor sensitivities.

The microcontroller 406 may optionally include logic to determine when to actuate opening a valve 502a, 502b. Alternatively, the microcontroller may be operable to transmit the valve actuation signal to the at least one valve responsive to receiving a sensor actuation command through the interrogation interface (not shown).

The at least one valve 502a, 502b may be configured to substantially prevent flow of a fluid into the at least one fluid receiving volume 416a, 416b and into communication with the sensing circuit 410 from outside the package 414 prior to deployment of the electronic tag 501. Thus, degradation of the sensing circuit portion 422a, 422b may be avoided prior to deployment.

Figure 6:
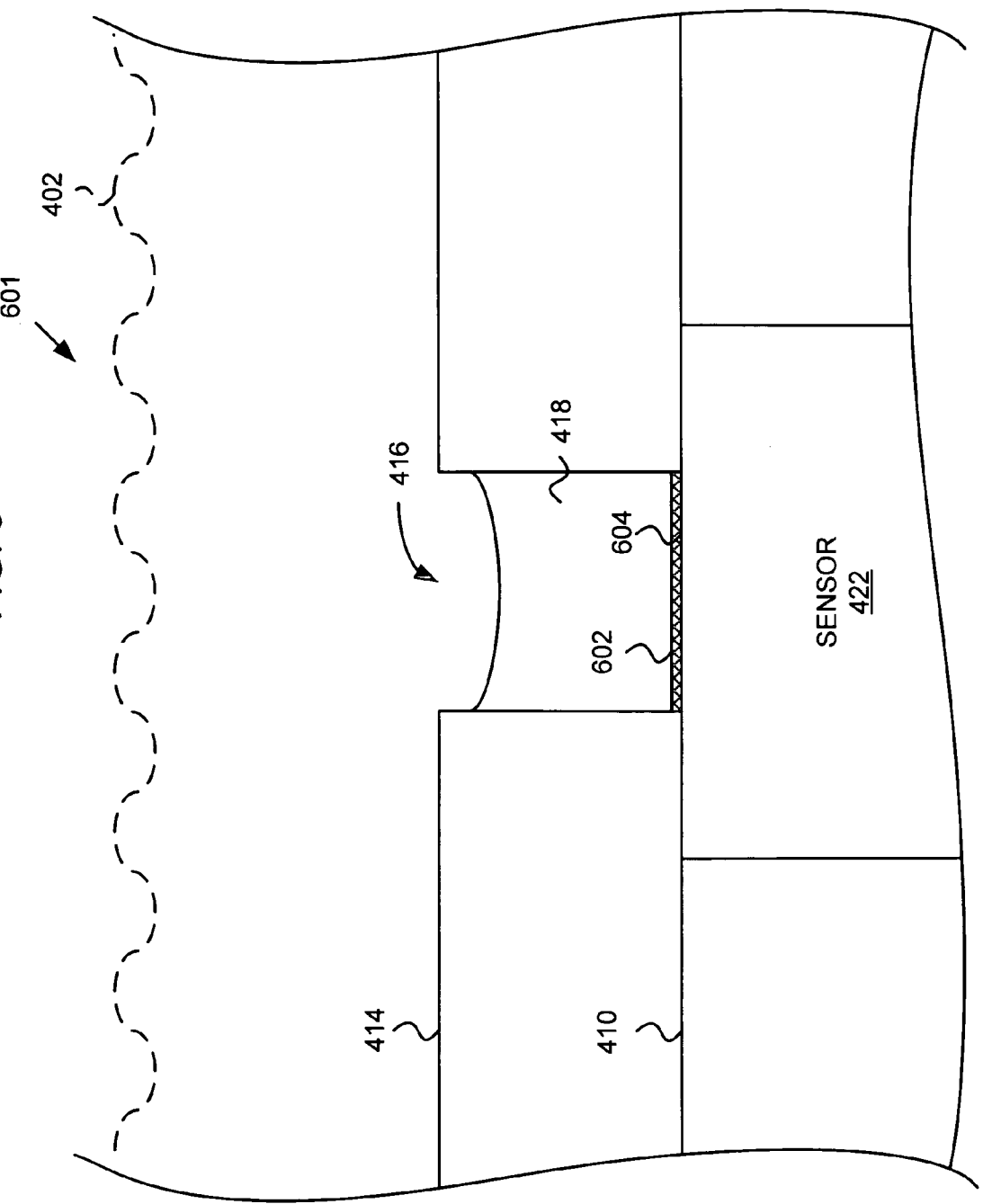
FIG. 6 is a diagram of a portion of an electronic tag including a valve operable to selectively expose a sensor portion to a fluid receiving volume, according to an embodiment.

FIG. 6 is a diagram of a portion of an electronic tag 601 including a valve 602 operable to selectively expose a sensor portion to a fluid receiving volume, according to an embodiment. Additionally or alternatively to a valve 502a for selectively admitting fluid from a plant environment 402 to a fluid receiving volume 416 (FIG. 5), a valve 602 may be configured to selectively allow contact between fluid 418 in a fluid receiving volume 416 and a sensing surface 604 of a sensing circuit portion 422.

A valve 502, 602 may, for example, include a resistive material configured to undergo a temperature rise responsive to application of an actuation signal. A second material, such as a polymer film or a wax, in contact with the resistive material may fuse to open the valve. Alternatively, the resistive material may be formed as a film that fuses to allow passage of fluid. Alternatively, the second material may include a material such as a salt or a cellulosic material that becomes soluble responsive to the application of heat from the resistive material, and the fluid in the environment or another solvent resident near the valve (and heated by the resistive material and/or the second material) may dissolve the second material to allow the passage of fluid. Alternatively, a valve 502, 602 may include a MEMS device or other actuated valve. Alternatively, the valve 502, 602 may be manually opened.

Figure 7:
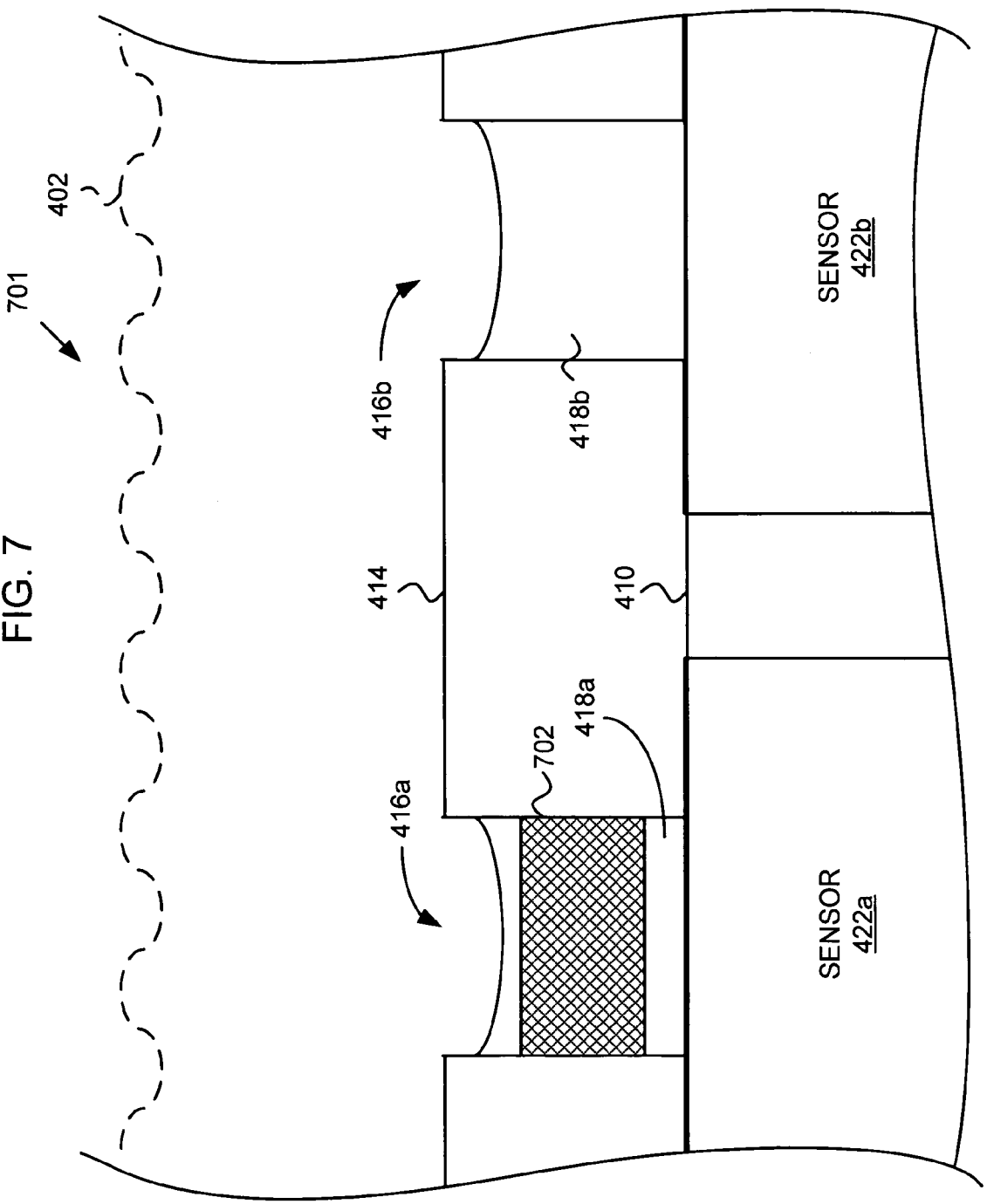
FIG. 7 is a diagram of a portion of an electronic tag including at least one fluid receiving volume configured to selectively admit at least one component from the environment of a plant, according to an embodiment.

FIG. 7 is a diagram of a portion of an electronic tag 701 including at least one fluid receiving volume 416a in a package 414, the at least one fluid receiving volume 416a being configured to selectively admit at least one component from the environment of a plant 402, according to an embodiment. The at least one fluid receiving volume 416a may include a filter 702 to selectively admit and/or exclude components from the environment 402. For example, the at least one fluid receiving volume 416a may be configured to receive a gas or a vapor and configured and exclude a liquid. Or the at least one fluid receiving volume 416a may be configured to receive at least one gas and exclude a vapor.

For example, the at least one fluid receiving volume 416a may include a gas permeable membrane or filter 702 configured to allow passage of a gas but exclude a vapor in solution. For example, a plant may excrete an alkaloid in response to injury, the alkaloid being carried as a dissolved vapor in the air surrounding the plant. The gas permeable membrane 702 may include a binding moiety configured to bind to the alkaloid, thus excluding the alkaloid vapor from passing to the at least one fluid receiving volume 416a and/or a corresponding sensing circuit portion 422a. Alternatively, a filter 702 such as activated charcoal may be provided to trap vapors dissolved in the air and allow passage of substantially clean air into the fluid receiving volume 416a and/or into contact with the sensing circuit portion 422a.

Similarly, the at least one fluid receiving volume 416a may be configured to receive at least one liquid and configured to exclude a substance dissolved in the liquid.

According to an embodiment, a sensing circuit 410 may include at least two sensing circuit portions 422a, 422b configured to sense different fractions of components from a plant environment 402. For example, the electronic tag 701 may include a first fluid receiving volume 416b configured to receive a first fluid 418b and a second fluid receiving volume 416a configured to receive a second fluid 418a including a first portion of the first fluid 418b and excluding a second portion of the first fluid 418b. A first sensing circuit portion 422b may be operatively coupled to the first fluid receiving volume 416b and configured to measure a parameter of the first fluid 418b, and a second sensing circuit portion 422a may be operatively coupled to the second fluid receiving volume 416a and configured to measure the parameter of the second fluid 418a.

The microcontroller (not shown) may be configured to receive a corresponding signal from each of the first 422b and second 422a sensing circuit portions and deduce the parameter of the excluded portion of the first fluid 418b. Or, the microcontroller (not shown) may be configured to receive a corresponding signal from each of the first 422b and second 422a sensing circuit portions and deduce a second parameter of the excluded portion of the first fluid 418b.

For example, the first sensing circuit portion 422b may measure a conductivity, reactivity, other first parameter, such as of air 418b including a dissolved vapor, or water including a dissolved solute, received within the corresponding fluid receiving volume 416b, and transmit a corresponding first signal to the microcontroller (not shown). The second fluid receiving volume 416a may be configured to receive air excluding the dissolved vapor or water excluding the dissolved solute 418a. The corresponding second sensing circuit portion 422a may measure the same parameter corresponding to the depleted fluid 418a and transmit a corresponding second signal to the microcontroller (not shown). The difference between the signals may be attributable to the effect of the solute present in the first fluid 418b but excluded from the second fluid 418a. For example, when the first and second signals correspond to electrical conductivity of the respective fluids 418b, 418a, the difference between signals may be attributed to the effective conductivity of the excluded solute. The difference between signals may further be used to deduce a different parameter, such as concentration, by correlating the parameter difference, such as conductivity, to the concentration of the solute in the first fluid 418b.

The filter 702 may include a microporous membrane configured to permit passage of a gas into the at least one fluid receiving volume 416a and exclude a vapor from the at least one fluid receiving volume 416a. The filter 702 may include a microporous membrane configured to permit passage of a gas and/or a vapor into the at least one fluid receiving volume 416a and exclude a liquid from the at least one fluid receiving volume 416a. The filter 702 may include a microporous membrane configured to permit passage of a gas, a vapor, and/or a liquid into the at least one fluid receiving volume 416a and exclude a dissolved substance from the fluid 418a within the at least one fluid receiving volume 416a.

Optionally, the electronic tag 701 may include a heater (not shown) disposed near or in at least one fluid receiving volume 416b and configured to dry the at least one fluid receiving volume 416b responsive to receiving a dry actuation signal from the microcontroller (not shown). For example a resistive trace may be disposed on a semiconductor surface making up a sensing circuit portion 422b, or a resistor may be embedded in or on the walls of the package 414 at a location corresponding to the fluid receiving volume 416b.

The electronic tag 701 may include at least one first fluid receiving volume 416b configured to receive a first fluid 418b and a second fluid receiving volume 416a configured to receive a second fluid 418a, the second fluid 418a including the first fluid 418b with a solute or suspension excluded.

Figure 8:
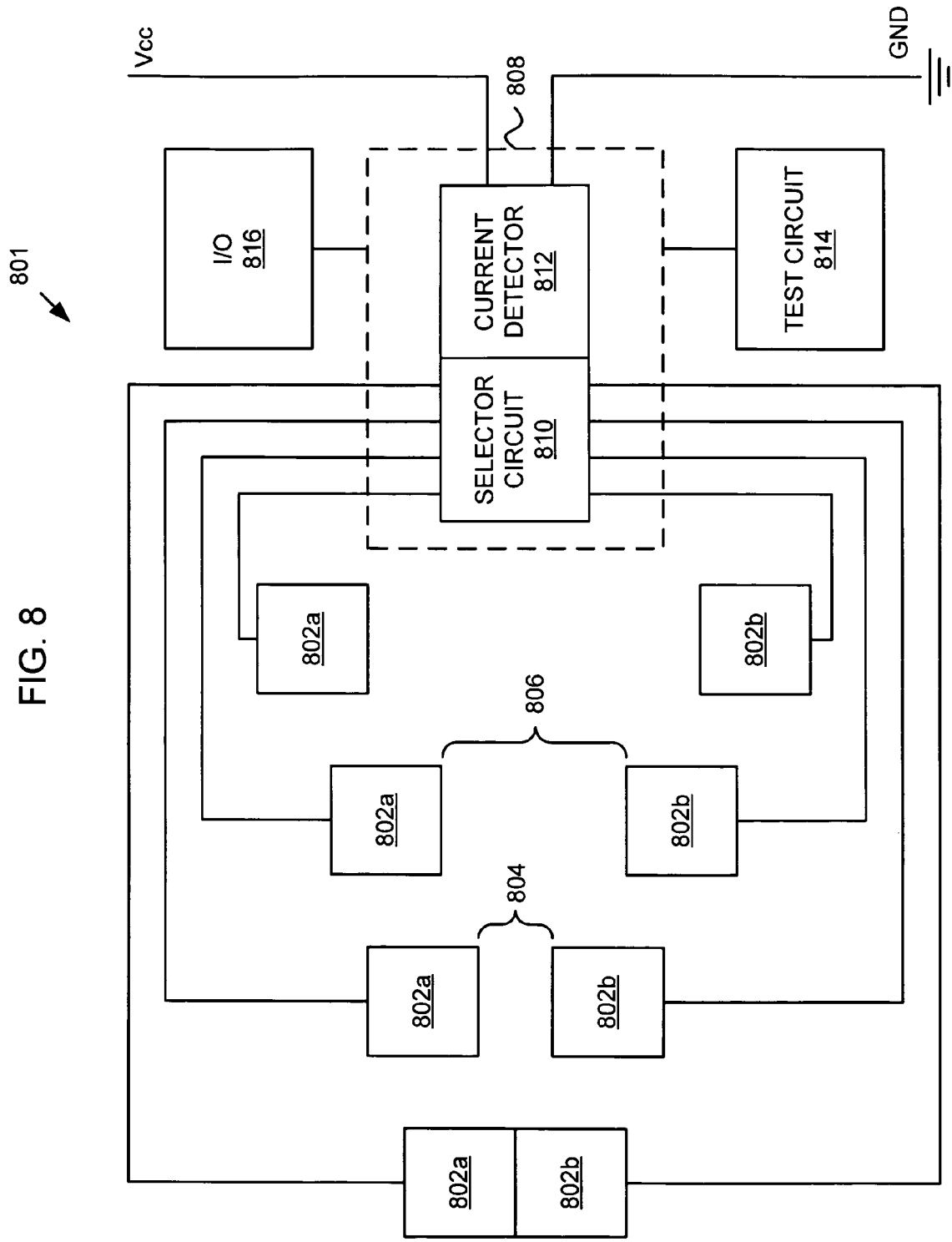
FIG. 8 is a diagram of a portion of an electronic tag having a sensing circuit including at least one electrode array, according to an embodiment.

FIG. 8 is a diagram of a portion of an electronic tag 801 having a sensing circuit including at least array of electrodes 802a, 802b. The electrode array illustrates one of several types of sensor portion arrangements that may be used according to various embodiments.

The array of electrodes includes at least two gap sizes 804, 806 between electrode pairs 802a, 802b. The gaps 804, 806 between electrode pairs 802a, 802b includes a relatively large gap 806 configured to conduct when a received fluid is relatively conductive and at least a second relatively small gap 804 configured to conduct when the received fluid is relatively non-conductive. A comparator circuit 808 may include a selector circuit 810 configured to select an electrode pair 802a, 802b and a current sense or voltage drop sense circuit 812 configured to sense when a gap 804, 806 between electrodes 802a, 802b is conductive and when the gap is not conductive. The electrode array may include at least one test circuit 814 configured to verify the operation of the electrode array. An interface circuit 816 may be configured to output one or more sense signals to a microcontroller (not shown).

Figure 9:
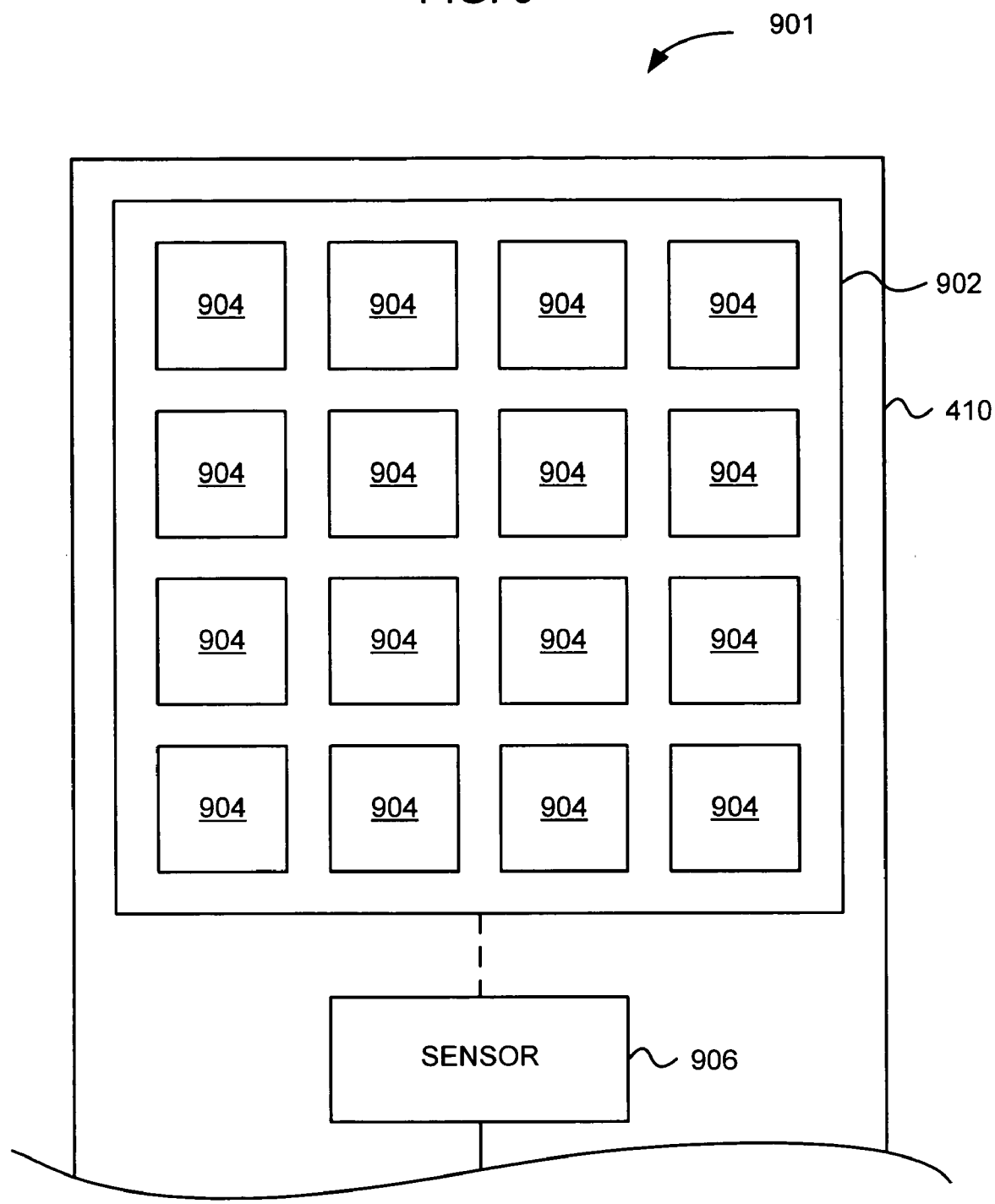
FIG. 9 is a diagram of a portion of an electronic tag having a sensing circuit including an array of active regions, according to an embodiment.

FIG. 9 is a diagram of a portion of an electronic tag 901 having a sensing circuit 410 including an array 902 of active regions 904, according to an embodiment. Each active region 904 may include an analyte-specific binding moiety. The sensing circuit 410 includes at least one sensor 906 configured to sense when the moiety of an active region has bound to an analyte. The analyte-specific binding moiety may include a self-assembled monolayer. For example at least one of the plurality of analyte-specific moieties may be configured to bind a protein such as a protein correlated to at least one plant disease and/or a protein correlated to plant health. At least one of the plurality of analyte-specific moieties may be configured to bind to a protein that is released from a plant when damage occurs to the plant.

The array 902 of active regions 904 may be configured that to include at least one active region 904 including a plurality of analyte-specific binding moieties. The sensor 906 may be configured to sense when at least one of the plurality of analyte-specific binding moieties of an active region has bound to an analyte. At least one of the active regions 904 may be configured to provide a competitive assay. For example, at least one of the array of active regions 904 may include a moiety configured to release from the active region 904 when binding to the analyte occurs.

According to an embodiment of the electronic tag 901, at least one of the array of active regions 904 may includes a moiety configured to generate a reduction-oxidation current when binding occurs. The sensor 906 may include a current sensor configured to sense the reduction-oxidation current.

According to an embodiment of the electronic tag 901, the array 902 may include a surface plasmon resonance (SPR) conversion coating, for example gold, configured to convert impinging light to a surface plasmon depending upon binding of an active region 904 to an analyte. The sensor 906 may include an SPR sensor configured to sense binding of at least one of the plurality of analyte-specific moieties to the analyte.

Returning to FIG. 4, according to embodiments, an electronic tag 401 may have a sensing circuit 410 including one or more sensing circuit portions 422c configured to sense one or more parameters corresponding to the environment of a plant 402 using approaches other than contact with fluids 418a, 418b. For example, the sensing circuit 410 may include a temperature sensor 422c. In such case, it may be advantageous for the package 414 to include at least one thermal conductor (not shown) in operative communication with the sensing circuit portion 422c. In another example, the sensing circuit portion 422c may include a light sensor, and the package 414 may include at least one light conductor in operative communication with the sensing circuit portion 422c. The light conductor may include a filter configured to admit a selected wavelength portion of the light spectrum, for example a portion corresponding to plant health.

A range of sensor technologies may be used in sensors 422a, 422b, 422c. For example, one or more of the sensors 422a, 422b, 422c may include one or more of a temperature sensor, a thermistor, a thermocouple, a bimetal spring, a biosensor, a microarray, an active region, a reactive monolayer; an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotubes sensor, an electromagnetic transmissivity sensor, a piezo-electric sensor, and/or an electrode array.

The sensing circuit 410 may be configured to generate a signal corresponding to the environmental parameter. The generated signal may include at least a signal portion proportional to a value of the environmental parameter.

The sensing circuit 410 may include a molecular sensor. For example the molecular sensor may include a protein sensor.

The electronic tag 401 may be disposed on an integrated circuit 412, and the sensing circuit 410 may be an integrated portion of the integrated circuit. The electronic tag 401 may be configured as a passive device wherein substantially all power to operate the sensor circuit 410 and the interrogation interface 404 is drawn from an interrogation electromagnetic field (not shown). Alternatively, at least a portion of the power to operate the sensing circuit 410 and/or the interrogation interface 404 may be provided by a battery (not shown).

Figure 10:
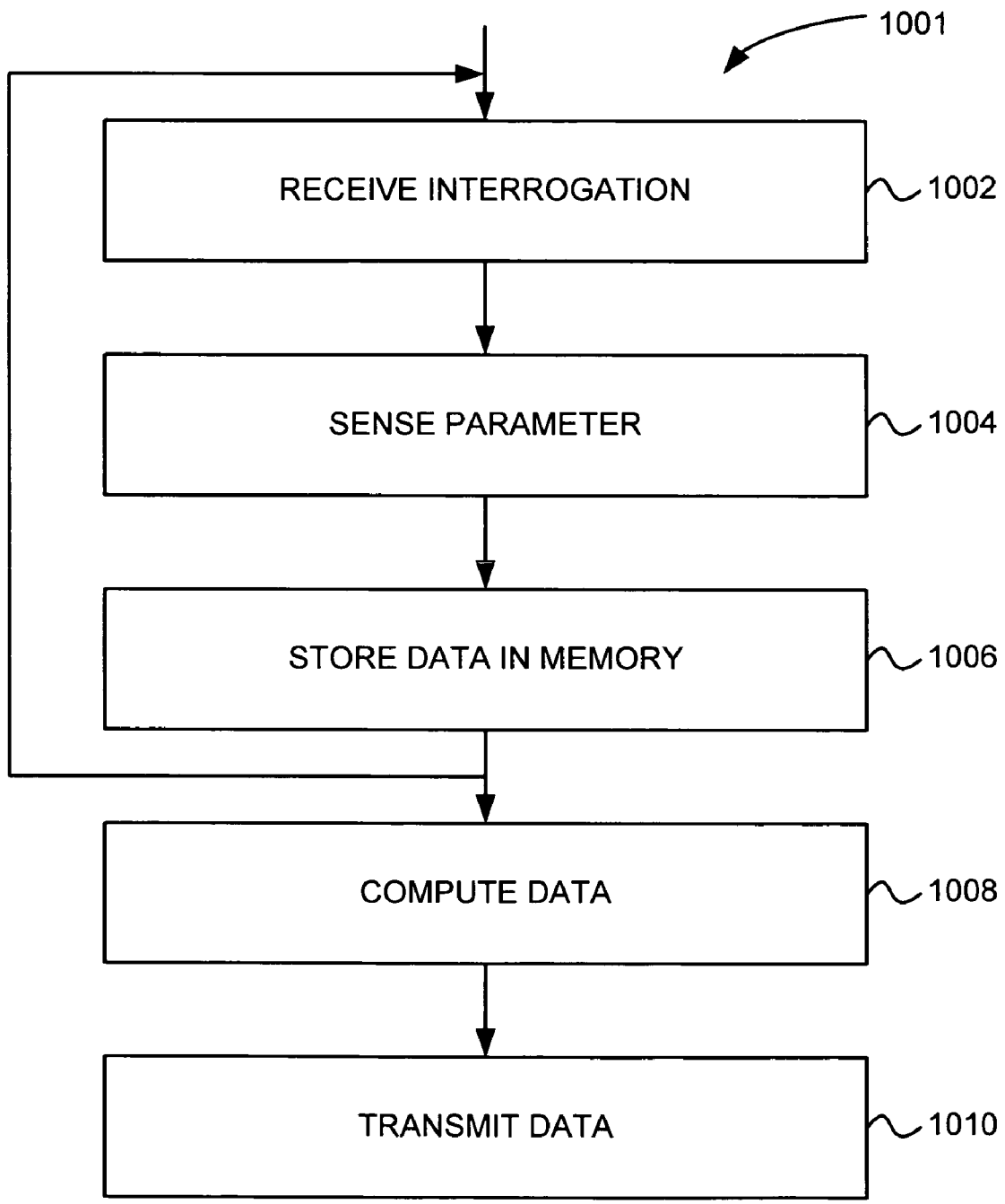
FIG. 10 is a flow chart illustrating a method performed by an electronic tag for measuring the environment of at least one plant, according to an embodiment.

FIG. 10 is a flow chart illustrating a method 1001 performed by an electronic tag for measuring the environment of at least one plant, according to an embodiment. At step 1002, an interrogation signal is received by an interrogation interface in the electronic tag. The interrogation signal may take a range of forms and may include a range of contents and/or instructions.

According to one embodiment, the interrogation requests data corresponding to a sensed parameter related to the environment of at least one plant. According to an embodiment, the interrogation signal may indicate that the parameter should be sensed and corresponding data written to memory without transmitting the data to the interrogator.

The interrogation signal received in step 1002 may optionally include one or more actuation instructions. For example interrogation may include a command to actuate a valve opening from a plant environment to one or more fluid receiving volumes and/or from one or more fluid receiving volumes to one or more sensors.

The interrogation signal may also include computation instructions that direct the electronic tag to perform one or more computations on sensed parameter data. The interrogation signal may also include reset sensor instructions which may include instructions to heat a heater to drive moisture from a fluid receiving volume and/or perform a test of a sensor using a test circuit.

When the interrogation signal includes a sensor actuation command, a microcontroller in the electronic tag may issue a valve actuation to open a valve to at least one fluid receiving volume to allow fluid from at or in the vicinity of the environment of the at least one plant to flow into the at least one fluid receiving volume for sensing. For example, such actuation may include sequentially opening valves to first and second fluid receiving volumes. The valve may be opened by fusing a gate in the electronic tag package containing the sensing circuit and the fluid receiving volumes. Actuation may also include actuating a device disposed in or near at least one fluid receiving volume to drive off moisture from the at least one fluid receiving volume.

In step 1004 at least one parameter corresponding to the environment of a plant is sensed by a sensing circuit in the electronic tag. According to some embodiments, sensing may be performed under control of a microprocessor or microcontroller in the electronic tag. According to other embodiments, sensing may be performed responsive to the interrogation received in step 1002.

Sensing at least one parameter may include using at least one sensor such as a temperature sensor, a thermistor, a thermocouple, a bimetal spring, a biosensor, a microarray, an active region, a reactive monolayer; an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotubes sensor, an electromagnetic transmissivity sensor, a piezo-electric sensor, or an electrode array to sense a corresponding parameter.

Sensing may include receiving at least one first fluid from the environment of the at least one plant in at least one first fluid receiving volume wherein the sensed parameter is sensed from the at least one first fluid in the at least one first fluid receiving volume. Sensing may also include receiving at least one second fluid from the environment of the at least one plant in at least one second fluid receiving volume and sensing a second parameter from the at least one second fluid in the at least one second fluid receiving volume. For example, at least one component present in the first fluid may be excluded from the second fluid in the second fluid receiving volume. The first and second parameters may optionally be substantially the same or different parameters.

As mentioned above, sensing may be performed using one or more of a range of sensing technologies. For example, sensing at least one parameter may include sensing using at least one electrode array. Sensing using an electrode array may include selecting at least one gap size from an electrode array including at least two gap sizes and sensing the conductivity of at least one fluid having a conductivity in a range corresponding to the selected at least one gap size.

According to an embodiment, sensing at least one parameter may include receiving a fluid at an array of active regions, each active region including at least one analyte-specific binding moiety and sensing if at least one analyte-specific moiety of an active region has bound to the analyte. Sensing if at least one analyte-specific moiety of an active region has bound to an analyte may include sensing a reduction-oxidation current, or performing surface plasmon resonance detection, for example. At least one of the active regions may include a protein binding moiety.

In optional step 1006, data corresponding to the parameter sensed in step 1004 may be stored in electronic tag memory. According to one embodiment, data corresponding to the sensed data may be stored in the memory circuit with transmitting the data corresponding to the sensed at least one parameter. According to an embodiment, data corresponding to the sensed data may be stored in the memory circuit without transmitting the data corresponding to the sensed at least one parameter.

Steps 1002, 1004, and/or 1006 may be repeated. For example, after receiving interrogation 1002, sensing a parameter 1004, and storing data corresponding to the parameter in memory 1006 a first time, the process may loop back to step 1002 where the electronic tag receives a second interrogation signal, then proceeds to step 1004 where a second parameter is sensed responsive to the second interrogation signal, and then to step 1006 wherein data corresponding to the second parameter is stored in the memory circuit. The parameters sensed in the first instance of step 1004 and the second instance of step 1004 may be the same or different. Then, a third interrogation signal may be received, and, responsive to the third interrogation signal, the process may proceed to step 1008 where data is computed.

In step 1008, data may be computed by combining data corresponding to a first parameter sensing step 1004 with data corresponding to a second parameter sensing step 1004. The combined data, or third data, may be determined using one or more of a range of techniques such as Boolean logic, arithmetic logic, fuzzy logic, state machine logic, array logic, and a look-up table.

For example, a first parameter corresponding to total alkalinity may be sensed and stored as corresponding first data. A second parameter corresponding to total alkalinity minus a fertilizer component (which for example may be captured in a filter and not allowed to reach a sensing circuit portion) may be sensed and stored as second data. Then, in step 1008, the first and second data may be combined to produce data corresponding to a concentration of the fertilizer component.

According to another example, one particular parameter may be sensed a plurality of times. Then an average, a range, or other statistical function may be calculated from data corresponding to the plurality of sense instances.

Proceeding to step 1010, data is transmitted to the interrogator through the interrogation interface. For example, the data may correspond to one parameter sensed in step 1004, or the data may include data received during plural sense steps and stored in memory in step 1006, and/or may correspond to data derived from plural sense steps by computing in step 1008.

According to some embodiments, the process 1001 moves from step 1002 to step 1004, and then directly to step 1010. The sensed data may correspond to a register value that is substantially continuously updated by the electronic tag, or alternatively substantially all sensing may be performed responsive to receipt of an interrogation signal. Looping and/or computation may be alternatively performed by a computing system remote from the electronic tag.

Optionally, data transmitted in step 1010 may correspond to an indication of a failed test, indication of a test circuit output, or indication of non-availability of the specified sensing function.

Figure 11:
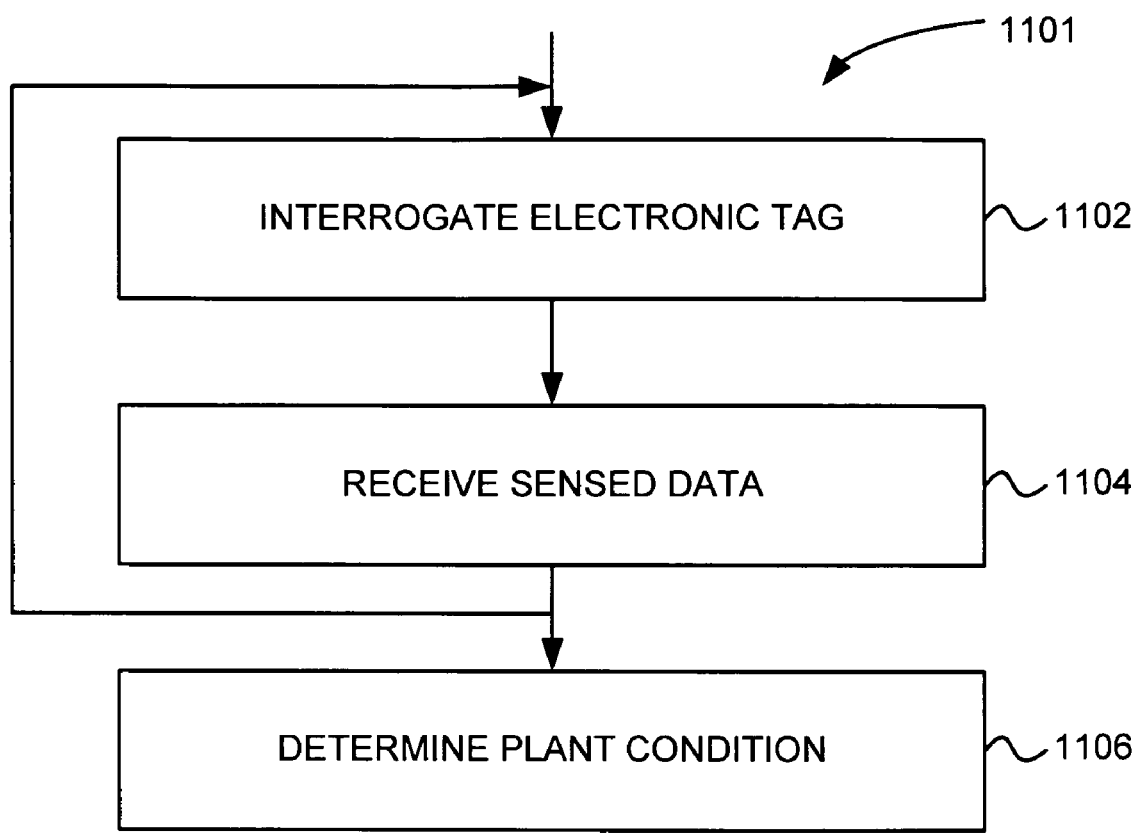
FIG. 11 is a flow chart illustrating a method used by a system for monitoring the environment of at least one plant using an electronic tag, according to an embodiment.

FIG. 11 is a flow chart illustrating a method 1101 used by a system for monitoring the environment of at least one plant using an electronic tag, according to an embodiment. Referring to FIG. 1, the steps shown in FIG. 11 may be performed substantially completely by an interrogator 106, by one or more remote resources 116a, 116b, or by a combination of computing resources.

In step 1102, an electronic tag operatively coupled to at least one plant is interrogated. Then, in step 1104, sensed data is received from the electronic tag, the sensed data corresponding to at least one sensed environmental parameter from the environment of the at least one plant.

The interrogation step 1102 may optionally be performed more than one time and/or include more than one command. For example, a first interrogation signal may include a command to delete an old value in the memory of the electronic tag and a second interrogation signal may include a command to write to the memory a new value from the sensing circuit, or an interrogation command may include a command to authorize the overwriting of an existing data value in the memory of the electronic tag. An interrogation command may include a command to use the sensing circuit to sense the environmental parameter associated with the at least one plant. An interrogation command may include a command to write a data value corresponding to the sensed environmental parameter to a memory of the electronic tag. A single interrogation command may include a command to sense and transmit data corresponding to the sensed value.

The interrogation step 1102 may optionally include an actuation command, such as a command to open a valve, drive off moisture, or enable a new sensing circuit portion. For example, interrogating an electronic tag 1102 may include transmitting an electronic tag interrogation signal corresponding to a command to open at least one valve to at least one fluid receiving volume. Step 1102 may include transmitting a sequence of electronic tag interrogation signals corresponding to commands to open a sequence of valves to a sequence of fluid receiving volumes.

Proceeding to step 1104, the sensed data is received from the electronic tag. According to some embodiments, the sensed at least one environmental parameter includes two environmental parameters. Step 1104 may further include calculating a combination (third) environmental parameter from the two environmental parameters. For example, the combination environmental parameter may includes a concentration of a dissolved substance in a fluid at or near the environment of the at least one plant.

The sensed data received in step 1104 may include data from one or more of various sensors such as a temperature sensor, a thermistor, a thermocouple, a bimetal spring, a biosensor, a microarray, an active region, a reactive monolayer; an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotubes sensor, an electromagnetic transmissivity sensor, a piezo-electric sensor, or an electrode array.

Proceeding to step 1106 at least one plant condition is determined. The plant condition may be related to health, ripeness, readiness for a next step to market, etc. Determining a plant condition 1106 may include determining at least one treatment schedule for the at least one plant as a function of the received data from the electronic tag. According to embodiments, determining a plant condition 1106 may include determining from the received data at least one treatment schedule including planting, cutting, harvesting, grafting, staking, pruning, transplanting, repotting, temperature control, root temperature control, light intensity, light duration, light schedule, pH control, humidification, dehumidification, watering, watering volume, watering duration, watering schedule, fertilizing, fertilizer type, pesticide application, pesticide type, pesticide amount, herbicide application, herbicide type, herbicide amount, fungicide application, fungicide type, or fungicide amount.

The process 1101 may be repeated across a plurality or a plurality of a plurality of plants. For example, step 1102 may include transmitting electronic tag interrogation signals to a plurality of electronic tags operatively coupled to the environments of a corresponding plurality of at least one plants. Receiving sensed data step 1104 may include receiving a substantially corresponding plurality of data from the plurality of electronic tags corresponding to the at least one plant environments. Step 1106 may include analyzing the plurality of data and determining a plurality of treatments. Alternatively, step 1106 may include analyzing the data and determining a substantially uniform schedule for one or more treatments as a function of the plurality of data.

FIG. 12 is a simplified diagram of a system for sensing growth conditions of at least one plant 102, according to an embodiment. A plurality of deployable radio frequency tags 104 include at least a portion of the plurality of deployable radio frequency tags configured to sense the environment of at least one plant 102. At least one interrogator 1202a is configured to interrogate the plurality of deployable radio frequency tags 104 At least one computing resource 1204 is coupled to receive a signal from the at least one interrogator 1202a. The at least one computing resource 1204 is operable to support execution of a computer program 1206.

The computer program 1206 is configured to interrogate at least one of the plurality of deployable radio frequency tags 104 to receive at least one parameter value, the parameter value corresponding to the sensed environment of the at least one plant 102. The computer program 1206, which may be provided on a computer-readable medium, may be further configured to determine at least one treatment schedule for the at least one plant.

The radio frequency tags 104 may be coupled substantially 1:1 to the plurality of plants 102. Alternatively, the number of radio frequency tags 104 may differ from the number of plants 102. The deployable radio frequency tags 104 may, for example, include at least one of a passive radio frequency tag, an active radio frequency tag, a backscatter radio frequency tag, a half-duplex radio frequency tag, and/or a full-duplex radio frequency tag.

The at least one interrogator 1202a may includes at least a plurality of antennas 1202a, 1202b configured to interrogate the plurality of radio frequency tags 104. The at least one interrogator 1202a may include a plurality of interrogators 1202a, 1202b configured to interrogate the plurality of radio frequency tags 104. A plurality of antennas and/or interrogators 1202a, 1202b may be configured to interrogate radio frequency tags 104 in a plant care volume greater than the interrogation range of a single interrogator and/or antenna 1202a.

The computing resource 1204 may further be configured to drive the at least one interrogator 1202a to write at least one treatment schedule to at least one of the plurality of deployable radio frequency tags 104. According to some embodiments, the computing resource 1204 and the interrogator 1202a are included in an integrated apparatus. According to other embodiments, the computing resource 1204 and the interrogator 1202a may include separate resources in communication with one another. Optionally, the computing resource 1204 includes a remote resource accessed via a computer network (not shown). The computing resource 1204 may further include distributed processing resources.

FIG. 13 is a block diagram of a radio frequency tag 1301 including circuitry 1302 in a package 1304 and configured to measure the environment of at least one plant, according to an embodiment. The radio frequency tag 1301 includes an interrogation interface 404, a microcontroller 406 operatively coupled to the interrogation interface 404, a sensing circuit operatively 1308 coupled to at least the microcontroller 406, a serial sense selection driver 1306 operatively coupled to at least the microcontroller 406, and an array of actuatable sense cells 904 coupled for selection by the serial sense selection driver 1306 and for sensing by the sensing circuit 1308. The actuatable sense cells 904 include at least two cells 904 configured to sense the environment of at least one plant.

According to some embodiments, sense cell 904 may use a technology that is substantially "used up" or otherwise inactivated by the process of sensing. For example, a monolayer of protein-specific ligands may be effective until the protein is encountered, at which time the binding sites are associated with (filled by) the protein. Since electronic tags may generally not include fluidic mechanisms to flush the protein from the binding sites in a dissociation reaction, the binding sites, once associated, may not reliably dissociate to once again gain sensitivity to the protein. The actuatable sense cells 904 may be configured for sequential, disposable use for sensing an environmental parameter.

According to an embodiment, the electronic tag may retain sensitivity to the protein by providing a succession of sensor portions 904, each of the succession being sensitive to the protein. Thus, when a sensor portion detects the presence of the protein, the selector 1306 may select a "clean" sensor portion, for example by opening a valve or removing a disposable cover to allow a fluid from the environment to be exposed to the newly activated sensor portion. If the protein is absent from the environment when the new sensor portion is opened, the new sensor portion may remain sensitive to the protein. If the protein is present in the environment when the new sensor portion is opened, the microcontroller 406 and selector 1306 may wait for a time for the protein to be removed (for example while applying irrigation to the at least one plant to flush the protein from the environment) and then activate a third sensor portion to again test for presence of the protein.

The electronic tag may include a driver to serially select sensor circuit portions 904 to extend sensitivity to environmental conditions that inactivate their respective sensor proteins. The driver 1306, a serial sense selection driver, may thus select each of an array of actuatable cells 904.

The package 1304 and/or the circuitry 1302 may include a plurality of fusable valves operable for actuation (opening) by the serial sense selection driver 1306. For example, a fusable valve may be provided as a thin wall separating a (nascent) fluid receiving volume from the environment, and a resistor configured to melt the thin wall to allow fluid from the environment to enter the fluid receiving volume. For example, the fusable valve may be configured as a thin aluminum film disposed on a thin thermoplastic film having a melting point lower than the melting point of aluminum. The valve may be actuated by the microcontroller 406 by temporarily applying an electric potential across the aluminum film to drive current greater than the current carrying capacity of the film. The aluminum film then fuses, also opening a hole in the thermoplastic film and thus allowing fluids from the environment to enter the fluid receiving volume.

The actuatable sense cells 904 may thus be configured for extended life collective measurement of at least one environmental parameter. According to an embodiment, the radio frequency tag 1301 includes a compostable package 1304 configured to biodegrade after a succession of sequentially actuated sense cells disposably sense an environmental parameter.

According to some embodiments of the radio frequency tag 1301, the actuatable sense cells 904 may include differing sensitivities. For example, the actuatable sense cells 904 may be configured for tree logic determination of an environmental composition.

The foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The reader will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader may translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.; and may include systems having more than one of any of A, B or C, for example, $A_1$, $A_2$, and B, or A, $B_1$, $B_2$, $B_3$, and C.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. An electronic tag for measuring an environment of at least one plant, comprising:
   an electronic tag including an interrogation interface, a microcontroller, and memory circuitry;
   a sensing circuit operatively coupled to the microcontroller and configured to sense a parameter corresponding to the environment of at least one plant; and
   a package for the electronic tag, the package including at least one fluid receiving volume in operative communication with the sensing circuit.

2. The electronic tag of claim 1, wherein the electronic tag is passive.

3. The electronic tag of claim 1, wherein the electronic tag is disposed on an integrated circuit.

4. The electronic tag of claim 1, further comprising:
   at least one removable cover configured to provide separation of the at least one fluid receiving volume from the environment prior to removal of the at least one removable cover.

5. The electronic tag of claim 1, wherein the at least one fluid receiving volume is further configured for operative communication with an environment at or in the vicinity of the at least one plant.

6. The electronic tag of claim 1, wherein the at least one fluid receiving volume is substantially non-enclosed.

7. The electronic tag of claim 1, wherein fluid access to the at least one fluid receiving volume is dependent upon surface tension forces.

8. The electronic tag of claim 1, wherein fluid occupation of the at least one fluid receiving volume is dependent upon interaction of the fluid with at least one surface of the fluid receiving volume.

9. The electronic tag of claim 1, wherein the at least one fluid receiving volume includes plural fluid receiving volumes.

10. The electronic tag of claim 1, wherein the at least one fluid receiving volume is configured to receive at least one of gas or a vapor and configured to exclude a liquid.

11. The electronic tag of claim 1, wherein the at least one fluid receiving volume is configured to receive at least one gas and configured to exclude a vapor.

12. The electronic tag of claim 1, wherein the at least one fluid receiving volume is configured to receive at least one liquid and configured to exclude a substance dissolved in the liquid.

13. The electronic tag of claim 1, wherein the at least one fluid receiving volume includes:
   a first fluid receiving volume configured to receive a first fluid; and
   a second fluid receiving volume configured to receive a second fluid including a first portion of the first fluid and excluding a second portion of the first fluid.

14. The electronic tag of claim 13, wherein the sensing circuit includes:
   a first sensing circuit portion operatively coupled to the first fluid receiving volume and configured to measure a parameter of the first fluid; and
   a second sensing circuit portion operatively coupled to the second fluid receiving volume and configured to measure the parameter of the second fluid.

15. The electronic tag of claim 1, further comprising:
   a microporous membrane configured to permit passage of a gas into the at least one fluid receiving volume and exclude a vapor from the at least one fluid receiving volume.

16. The electronic tag of claim 1, further comprising:
   a microporous membrane configured to permit passage of at least one of a gas or a vapor into the at least one fluid receiving volume and exclude a liquid from the at least one fluid receiving volume.

17. The electronic tag of claim 1, further comprising:
   a microporous membrane configured to permit passage of at least one of a gas, a vapor, or a liquid into the at least one fluid receiving volume and exclude a dissolved substance from the at least one fluid receiving volume.

18. The electronic tag of claim 1, wherein the at least one fluid receiving volume includes a fluid receiving volume configured to receive a liquid.

19. The electronic tag of claim 1, wherein the at least one fluid receiving volume includes a liquid loaded prior to deployment of the electronic tag into the environment of the at least one plant.

20. The electronic tag of claim 19, wherein the fluid is selected to adsorb or dissolve an analyte from the environment and present the analyte to the sensing circuit.

21. The electronic tag of claim 19, wherein the fluid includes a hydrocarbon or substituted hydrocarbon selected to attract and dissolve a solute from the environment of the at least one plant.

22. The electronic tag of claim 1, wherein the at least one fluid receiving volume includes a first fluid receiving volume configured to receive a first fluid and a second fluid receiving volume configured to receive a second fluid, the second fluid including the first fluid with a solute or suspension excluded.

23. The electronic tag of claim 1, wherein the sensing circuit includes at least one electrode array.

24. The electronic tag of claim 23, wherein the electrode array includes at least two gap sizes including a relatively large gap configured to conduct when a received fluid is relatively conductive and at least a second relatively small gap configured to conduct when the received fluid is relatively non-conductive.

25. The electronic tag of claim 23, further comprising:
   a comparator circuit configured to sense when a gap between electrodes is conductive and when the gap is not conductive.

26. The electronic tag of claim 23, wherein the electrode array includes at least one test circuit configured to verify the operation of the electrode array.

27. The electronic tag of claim 1, further comprising a package for the electronic tag, the package including at least one thermal conductor in operative communication with the sensing circuit; and wherein the sensing circuit includes a temperature sensor.

28. The electronic tag of claim 1, further comprising a package for the electronic tag, the package including at least one light conductor in operative communication with the sensing circuit; and wherein the sensing circuit includes a light sensor.

29. The electronic tag of claim 28, wherein the at least one light conductor includes a filter configured to admit a selected wavelength portion of the light spectrum.

30. The electronic tag of claim 1, wherein the sensing circuit includes:
   an array of active regions, each active region including a plurality of analyte-specific binding moieties;
   an array of sensors that senses when at least one of the plurality of analyte-specific binding moieties of an active region have bound to the analyte;
   wherein at least a portion of the array of sensors senses a protein correlated to a plant health factor; and
   at least a portion including at least one of a temperature sensor, a thermistor, a thermocouple, a bimetal spring, a biosensor, a microarray, an active region, a reactive monolayer; an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotubes sensor, an electromagnetic transmissivity sensor, a piezo-electric sensor, or an electrode array.

31. The electronic tag of claim 1, wherein the sensing circuit is configured to generate a signal corresponding to the environmental parameter.

32. The electronic tag of claim 31, wherein the sensing circuit is configured to generate a signal proportional to a value of the environmental parameter.

33. The electronic tag of claim 1, wherein the electronic tag is disposed on an integrated circuit; and
wherein the sensing circuit is an integrated portion of the integrated circuit.

34. A method for measuring an environment of at least one plant, comprising:
in an electronic tag including an interrogation interface, a memory circuit, a sensing circuit, and a microcontroller operatively coupled to the interrogation interface, the memory circuit, and the sensing circuit;
sensing at least one parameter corresponding to the environment of at least one plant;
receiving an electronic tag interrogation signal through the interrogation interface;
responsive to the interrogation signal, storing in the memory circuit, data corresponding to the sensed at least one parameter without transmitting the data corresponding to the sensed at least one parameter.

35. The method of claim 34, further comprising:
receiving a second interrogation signal; and
responsive to the second interrogation signal:
sensing at least one second parameter corresponding to the environment of the at least one plant; and
storing in the memory circuit second data corresponding to the at least one second parameter corresponding to the environment of the at least one plant.

36. The method of claim 34, wherein the electronic tag is passive.

37. The method of claim 34, wherein the electronic tag is disposed on an integrated circuit.

38. The method of claim 34, further comprising:
removing a cover to allow communication between the environment of at least one plant and at least a portion of a sensing circuit.

39. The method of claim 34, further comprising:
receiving at least one first fluid from the environment of the at least one plant in at least one first fluid receiving volume;
and wherein the sensed parameter is sensed from the at least one first fluid in the at least one first fluid receiving volume.

40. The method of claim 39, further comprising:
receiving at least one second fluid from the environment of the at least one plant in at least one second fluid receiving volume; and
sensing a second parameter from the at least one second fluid in the at least one second fluid receiving volume.

41. The method of claim 40, further comprising:
calculating a third parameter corresponding to a combination of the first and second parameters.

42. The method of claim 40, further comprising:
excluding from the second fluid in the second fluid receiving volume a component of the first fluid.

43. The method of claim 34, wherein sensing at least one parameter includes using at least one sensor including a temperature sensor, a thermistor, a thermocouple, a bimetal spring, a biosensor, a microarray, an active region, a reactive monolayer; an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotubes sensor, an electromagnetic transmissivity sensor, a piezo-electric sensor, or an electrode array.

44. The method of claim 34, wherein sensing at least one parameter includes sensing using at least one electrode array.

45. The method of claim 44, wherein sensing at least one parameter includes selecting at least one gap size from an electrode array including at least two gap sizes; and
sensing the conductivity of at least one fluid having a conductivity in a range corresponding to the selected at least one gap size.

46. The method of claim 34, further comprising:
operating at least one test circuit configured to verify the operation of the sensing circuit.

47. The method of claim 34, wherein sensing the at least one parameter includes sensing at least one of temperature and light.

48. The method of claim 34, further comprising:
drawing substantially all power to operate a sensor and interrogation interface from an interrogation electromagnetic field.

49. The method of claim 34, further comprising:
drawing at least a portion of power to operate a sensor and interrogation interface from a battery.

50. A method for monitoring the environment of at least one plant, comprising:
transmitting an electronic tag interrogation signal to an electronic tag including a memory circuit, and a sensing circuit operatively coupled to the environment of a plant;
receiving data from the electronic tag corresponding to at least one sensed environmental parameter;
transmitting electronic tag interrogation signals to a plurality of electronic tags operatively coupled to the environments of a corresponding plurality of at least one plants;
receiving a substantially corresponding plurality of data from the plurality of electronic tags corresponding to the at least one plant environments;
analyzing the plurality of data and
determining a substantially uniform schedule for a particular treatment as a function of the plurality of data.

51. The method of claim 50, further comprising:
transmitting an interrogation command to delete an old value in the memory of the electronic tag; and
transmitting an interrogation command to write to the memory a new value from the sensing circuit.

52. The method of claim 50, further comprising:
transmitting an interrogation command to authorize the overwriting of an existing data value in the memory of the electronic tag.

53. The method of claim 50, further comprising:
transmitting an interrogation command to use the sensing circuit to sense the environmental parameter associated with the at least one plant.

54. The method of claim 50, further comprising:
transmitting an interrogation command to write a data value corresponding to the sensed environmental parameter to a memory of the electronic tag.

55. The method of claim 50, further comprising:
   determining at least one treatment schedule for the at least one plant as a function of the received data from the electronic tag.

56. The method of claim 50, wherein the at least one environmental parameter includes two environmental parameters; and further comprising:
   calculating a combination environmental parameter from the two environmental parameters.

57. The method of claim 56, wherein the combination environmental parameter includes a concentration of a dissolved substance in a fluid at or near the environment of the at least one plant.

58. The method of claim 50, further comprising:
   determining from the received data at least one treatment schedule including planting, cutting, harvesting, grafting, staking, pruning, transplanting, repotting, temperature control, root temperature control, light intensity, light duration, light schedule, pH control, humidification, dehumidification, watering, watering volume, watering duration, watering schedule, fertilizing, fertilizer type, pesticide application, pesticide type, pesticide amount, herbicide application, herbicide type, herbicide amount, fungicide application, fungicide type, or fungicide amount.

59. A system for sensing growth conditions of at least one plant, comprising:
   a plurality of deployable radio frequency tags, at least a portion of the plurality of deployable radio frequency tags configured to sense the environment of at least one plant;
   at least one interrogator configured to interrogate the plurality of deployable radio frequency tags, the at least one interrogator including at least a plurality of antennas configured to interrogate the plurality of radio frequency tags in a plant care volume greater than the interrogation range of a single antenna;
   a computing resource coupled to receive a signal from the at least one interrogator and operable to support execution of a computer program configured to:
      interrogate at least one of the plurality of deployable radio frequency tags to receive at least one parameter value, the parameter value corresponding to the sensed environment of the at least one plant;
      determine at least one treatment schedule for the at least one plant.

60. The system of claim 59, wherein the environment sensed by the plurality of deployable radio frequency tags includes a second plurality of at least one plants.

61. The system of claim 59, wherein the deployable radio frequency tags include at least one selected from the group consisting of a passive radio frequency tag, an active radio frequency tag, a backscatter radio frequency tag, a half-duplex radio frequency tag, and a full-duplex radio frequency tag.

62. The system of claim 59, wherein the computing resource is further configured to drive the at least one interrogator to write at least one treatment schedule to at least one of the plurality of deployable radio frequency tags.

63. The system of claim 59, wherein the computing resource and the interrogator are included in an integrated apparatus.

64. The system of claim 59, wherein the computing resource includes a remote resource accessed via a computer network.

65. A method for monitoring an environment of at least one plant, comprising:
   transmitting an electronic tag interrogation signal to an electronic tag including a sensing circuit operatively coupled to the environment of a plant;
   receiving data from the electronic tag corresponding to at least two sensed environmental parameters; and
   calculating a combination environmental parameter from the at least two sensed environmental parameters.

66. The method of claim 65, wherein the combination environmental parameter includes a concentration of a dissolved substance in a fluid at or near the environment of the at least one plant.

67. A method for measuring an environment of at least one plant, comprising:
   in an electronic tag including an interrogation interface and a sensing circuit;
   sensing at least one parameter corresponding to the environment of at least one plant;
   receiving an electronic tag interrogation signal through the interrogation interface; and
   removing a cover to allow communication between the environment of at least one plant and at least a portion of a sensing circuit.

68. A method for measuring an environment of at least one plant, comprising:
   in an electronic tag including an interrogation interface and a sensing circuit;
   sensing at least one parameter corresponding to the environment of at least one plant;
   receiving an electronic tag interrogation signal through the interrogation interface; and
   receiving at least one first fluid from the environment of the at least one plant in at least one first fluid receiving volume;
   wherein the sensed parameter is sensed from the at least one first fluid in the at least one first fluid receiving volume.

69. A method for measuring an environment of at least one plant, comprising:
   in an electronic tag including an interrogation interface and a sensing circuit;
   sensing at least one parameter using at least one electrode array that corresponds to the environment of at least one plant, wherein sensing at least one parameter further includes selecting at least one gap size from an electrode array including at least two gap sizes;
   receiving an electronic tag interrogation signal through the interrogation interface; and
   sensing the conductivity of at least one fluid having a conductivity in a range corresponding to the selected at least one gap size.

70. A method for measuring an environment of at least one plant, comprising:
   in an electronic tag including an interrogation interface and a sensing circuit;
   sensing at least one parameter corresponding to the environment of at least one plant;
   receiving an electronic tag interrogation signal through the interrogation interface; and
   operating at least one test circuit configured to verify the operation of the sensing circuit.

* * * * *